(12) United States Patent
Edwards et al.

(10) Patent No.: US 8,904,341 B2
(45) Date of Patent: Dec. 2, 2014

(54) DERIVING GROUNDED MODEL OF BUSINESS PROCESS SUITABLE FOR AUTOMATIC DEPLOYMENT

(75) Inventors: Nigel Edwards, Bristol (GB); Jerome Rolia, Kanata (CA); Lawrence Wilcock, Malmesbury (GB); Guillaume Alexandre Belrose, Marlborough (GB); Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2222 days.

(21) Appl. No.: 11/741,878

(22) Filed: Apr. 30, 2007

(65) Prior Publication Data

US 2008/0270973 A1    Oct. 30, 2008

(51) Int. Cl.
*G06F 9/44* (2006.01)
*G06F 9/445* (2006.01)
*G06Q 10/04* (2012.01)

(52) U.S. Cl.
CPC ............................ *G06Q 10/04* (2013.01)
USPC ................................ 717/104; 717/176

(58) Field of Classification Search
USPC ................................ 717/104, 176
See application file for complete search history.

(56) References Cited

U.S. PATENT DOCUMENTS

| | | | |
|---|---|---|---|
| 5,870,588 A | 2/1999 | Rompaey et al. | |
| 6,336,138 B1 | 1/2002 | Caswell et al. | |
| 6,405,364 B1 | 6/2002 | Bowman-Amuah | |
| 6,928,637 B2 | 8/2005 | Leherbauer | |
| 7,051,071 B2 * | 5/2006 | Stewart et al. | 709/204 |
| 7,065,740 B2 | 6/2006 | Westerinen et al. | |
| 7,155,664 B1 | 12/2006 | Lee et al. | |
| 7,239,311 B2 | 7/2007 | Dunn et al. | |
| 7,770,151 B2 * | 8/2010 | Sanjar et al. | 717/109 |
| 7,814,459 B2 * | 10/2010 | Behnen et al. | 717/104 |

(Continued)

FOREIGN PATENT DOCUMENTS

| | | |
|---|---|---|
| EP | 1542123 A2 | 6/2005 |
| EP | 1684170 | 7/2006 |

(Continued)

OTHER PUBLICATIONS

The International Search Report and the Written Opinion of the International Searching Authority for International App No. PCT/US2007/088315 dated Sep 5, 2008, pp. 10.

(Continued)

*Primary Examiner* — Ryan Coyer
*Assistant Examiner* — Hang Pan

(57) ABSTRACT

A business process (15) having a number of computer implemented steps using software application components, to enable automatic deployment on computing infrastructure, is modelled by a management system. It automatically derives a grounded model (55) of the business process from an unbound model (25) of the business process, based on an infrastructure design template (35). The unbound model specifies the application components to be used, and the grounded model adds a complete design of the computing infrastructure to be used. The use of an infrastructure design template can reduce the large number of options to be evaluated to help reduce the complexity of generating or changing the grounded model. The infrastructure design template formally relates the business process, application components and infrastructure design so that designs, or changes which are inconsistent or inefficient can be avoided. Thus more automation of the designing and changing the design is feasible.

19 Claims, 15 Drawing Sheets

(56) References Cited

U.S. PATENT DOCUMENTS

| | | | |
|---|---|---|---|
| 7,912,749 B2* | 3/2011 | Wong et al. ............... 717/104 |
| 2001/0044738 A1 | 11/2001 | Elkin et al. |
| 2002/0026630 A1 | 2/2002 | Schmidt |
| 2002/0111820 A1 | 8/2002 | Massey |
| 2002/0116083 A1 | 8/2002 | Schulze |
| 2003/0046639 A1 | 3/2003 | Fai et al. |
| 2003/0084156 A1 | 5/2003 | Graupner et al. |
| 2003/0177018 A1 | 9/2003 | Hughes |
| 2003/0182461 A1 | 9/2003 | Stelting et al. |
| 2004/0002891 A1 | 1/2004 | Chen et al. |
| 2004/0003119 A1 | 1/2004 | Munir et al. |
| 2004/0019688 A1 | 1/2004 | Nickerson et al. |
| 2004/0034552 A1* | 2/2004 | Cole et al. ............... 705/7 |
| 2004/0103396 A1 | 5/2004 | Nehab |
| 2004/0143470 A1 | 7/2004 | Myrick et al. |
| 2004/0148183 A1 | 7/2004 | Sadiq |
| 2004/0177335 A1 | 9/2004 | Beisiegel et al. |
| 2004/0205691 A1 | 10/2004 | Poole et al. |
| 2005/0055667 A1 | 3/2005 | Beringer et al. |
| 2006/0037002 A1* | 2/2006 | Vinberg et al. ............... 717/124 |
| 2006/0074733 A1 | 4/2006 | Shukla et al. |
| 2006/0161466 A1 | 7/2006 | Trinon et al. |
| 2006/0229922 A1 | 10/2006 | Levy et al. |
| 2006/0271581 A1 | 11/2006 | Sanjar et al. |
| 2007/0006218 A1* | 1/2007 | Vinberg et al. ............... 717/174 |
| 2007/0033093 A1 | 2/2007 | Divine et al. |
| 2007/0038756 A1 | 2/2007 | Waldorf et al. |
| 2007/0067204 A1 | 3/2007 | Brown |
| 2007/0094306 A1 | 4/2007 | Kyriazakos |
| 2007/0100930 A1 | 5/2007 | Moon et al. |
| 2007/0157165 A1* | 7/2007 | Kim ............... 717/113 |
| 2007/0169100 A1 | 7/2007 | Chamberlain et al. |
| 2007/0179828 A1 | 8/2007 | Elkin et al. |
| 2007/0240047 A1 | 10/2007 | Kosov et al. |
| 2008/0027769 A1 | 1/2008 | Eder |
| 2008/0103786 A1 | 5/2008 | Zhang et al. |
| 2008/0127047 A1 | 5/2008 | Zhang et al. |
| 2008/0312980 A1 | 12/2008 | Boulineau et al. |
| 2009/0183141 A1 | 7/2009 | Tai et al. |
| 2009/0198537 A1 | 8/2009 | Brown et al. |
| 2009/0313639 A1 | 12/2009 | Davis et al. |
| 2010/0017694 A1 | 1/2010 | Wick et al. |
| 2010/0030890 A1 | 2/2010 | Dutta et al. |
| 2010/0115490 A1 | 5/2010 | Wilcock et al. |

FOREIGN PATENT DOCUMENTS

| | | | |
|---|---|---|---|
| EP | 1710744 | A1 | 10/2006 |
| GB | 2354862 | | 4/2001 |
| GB | 2419701 | | 5/2006 |
| GB | 2419703 | A | 5/2006 |
| KR | 10-2004-0012250 | A | 2/2004 |
| KR | 10-0633478 | B1 | 10/2006 |
| WO | PCT-01/38976 | | 5/2001 |
| WO | WO-03/005167 | A2 | 1/2003 |
| WO | PCT-2004/090684 | A2 | 10/2004 |
| WO | WO-2005/029375 | A2 | 3/2005 |
| WO | PCT-2007/081406 | A2 | 7/2007 |

OTHER PUBLICATIONS

The International Search Report and the Written Opinion of the International Searching Authority for International App No. PCT/US2007/088322 dated Sep. 25, 2008, pp. 10.

The International Search Report and the Written Opinion of the International Searching Authority for International App No. PCT/US2007/088331 dated Aug. 25, 2008, pp. 11.

The Internationai Search Report and the Written Opinion of the International Searching Authority for International App No. PCT/US2007/088334 dated Sep. 25, 2008, pp. 11.

The International Search Report and the Written Opinion of the International Searching Authority for International App No. PCT/US2007/088338 dated Sep. 25, 2008, pp. 11.

The International Search Report and the Written Opinion of the International Searching Authority for International App No. PCT/US2007/088338 dated Aug. 25, 2008, pp. 11.

The International Search Report and the Written Opinion of the International Searching Authority for International App No. PCT/US2007/088346 dated Sep. 26, 2008, pp. 10.

Blunden Mark et al ~ "Storage Networking Virtualization What's it all about", IBM Recibooks, Dec. 1, 2000, XP002286341, pp. 16-89.

EP Search Report for Application No. 07855293.2, dated Apr. 27, 2011, pp. 5.

Eilam, T., et al., "Model-Based Automation of Service Deployment in a Constrained Environment", Tech. rep. RC23382, IBM, Sep. 2004.

Eilam, T., et al., "Reducing the Complexity of Application Deployment in Large Data Centers," IFIP/IEEE Int'l Symp. on Integrated Mgmt., 2005.

Goldsack, P., et al., "The SmartFrog Configuration Management Framework", ACM's Operating Systems Review (OSR); Jan. 2009.

Office Action dated Jun. 20, 2012, U.S. Appl. No. 12/808,223, dated Jun. 16, 2010.

Rolia, J., et al., "Adaptive Information Technology for Service Lifecycle Management", HP Laboratories Technical Report, 2008.

Office Action; U.S. Appl. No. 12/808,229; Dated Sep. 14, 2012.

* cited by examiner

DERIVING GROUNDED MODEL OF BUSINESS PROCESS SUITABLE FOR AUTOMATIC DEPLOYMENT

FIELD OF THE INVENTION

The invention relates generally to methods of modelling a business process having a number of computer implemented steps using software application components, to enable automatic deployment on computing infrastructure, and to corresponding apparatus and software.

BACKGROUND

Physical IT (information technology) infrastructures are difficult to manage. Changing the network configuration, adding a new machine or storage device are typically difficult manual tasks. In most physical IT infrastructure, resource utilization is very low: 15% is not an uncommon utilization for a server, 5% for a desktop. To address this, modern computer infrastructures are becoming increasingly (re)-configurable.

Hewlett Packard's UDC (Utility Data Centre) is an example which has been applied commercially and allows automatic reconfiguration of physical infrastructure: processing machines such as servers, storage devices such as disks, and networks coupling the parts. Reconfiguration can involve moving or starting software applications, changing allocations of storage space, or changing allocation of processing time to different processes for example. Another way of contributing more reconfigurability, is by allowing many "virtual" computers to be hosted on a single physical machine. The term "virtual" usually means the opposite of real or physical, and is used where there is a level of indirection, or some mediation between the resource user and the physical resource. There are many commercial storage virtualization products on the market from HP, IBM, EMC and others. These products are focused on managing the storage available to physical machines and increasing the utilization of storage. Virtual machine technology is a known mechanism to run operating system instances on one physical machine independently of other operating system instances. It is known, within a single physical machine, to have two virtual machines connected by a virtual network on this machine. VMware is a known example of virtual machine technology, and can provide isolated environments for different operating system instances running on the same physical machine.

There are also many levels at which virtualization can occur. For example HP's cellular architecture allows a single physical computer to be divided into a number of hard partitions or nPARs. Each nPAR appears to the operating system and applications as a separate physical machine. Similarly each nPAR can be divided into a number of virtual parititions or vPARs and each vPAR can be divided into a number of virtual machines (e.g. HPVM, Xen, VMware).

In addition future computing fabrics are likely to allow the underlying hardware to be reconfigured. In once instance the fabric might be configured to provide a number of four-way computers. In another instance it might be re-configured to provide four times as many single processor computers.

It is extremely complex to model the full reconfigurability of the above. Models of higher level entities need to be recursive in the sense of containing or referring to lower level entities used or required to implement them (for example a virtual machine VM, may operate faster or slower depending on what underlying infrastructure is currently used to implement it (for example hardware partition nPAR or virtual partition vPAR, as will be described in more detail below). This means a model needs to expose the underlying configurability of the next generation computer fabrics—an nPAR consists of a particular hardware configuration. This makes the models so complex that it becomes increasingly difficult for automated tools (and humans) to understand and process the models, to enable design and management of: a) the business process, b) the application and application configuration, and c) the infrastructure and infrastructure configuration.

The problem is that it is extremely complicated for automated tools to pick an appropriate solution. There are typically many constraints and many possibilities. It is often computationally intractable to search the entire solution space or to choose a suitable solution.

An additional problem with model-based systems is computing the differences between models so that management systems can move the system from one state to another. Even if sufficient computing power is used and a proposed new state can be designed, it is often difficult to compute the difference between the model of the system in its current state and the model of the new state of the system, such that the management system can move the system into the new state.

The need to model the full reconfigurability and recursive nature of a system is exemplified in the DMTF's profile for "System Virtualization, Partitioning and Clustering."

Another example of difficulties in modelling is WO2004090684 which relates to modeling systems in order to perform processing functions. It says "The potentially large number of components may render the approach impractical. For example, an IT system with all of its hardware components, hosts, switches, routers, desktops, operating systems, applications, business processes, etc. may include millions of objects. It may be difficult to employ any manual or automated method to create a monolithic model of such a large number of components and their relationships. This problem is compounded by the typical dynamic nature of IT systems having frequent adds/moves/changes. Secondly, there is no abstraction or hiding of details, to allow a processing function to focus on the details of a particular set of relevant components while hiding less relevant component details. Thirdly, it may be impractical to perform any processing on the overall system because of the number of components involved."

SUMMARY OF THE INVENTION

An object is to provide improved apparatus or methods. In one aspect the invention provides:

A method of modelling a business process having a number of computer implemented steps using software application components, to enable automatic deployment on a computing infrastructure, the method having the steps of:

automatically deriving a grounded model of the business process from an unbound model of the business process, the unbound model specifying the application components to be used for each of the computer implemented steps of the business process, without a complete design of the computing infrastructure, and the grounded model specifying a complete design of the computing infrastructure suitable for automatic deployment of the business process, the deriving of the grounded model having the steps of providing an infrastructure design template having predetermined parts of the computing infrastructure, predetermined relationships between the parts, and having a limited number of options to be completed, generating a candidate grounded model by generating a completed candidate infrastructure design based on the infrastructure design template, and generating a candidate configuration of the software application components used by the unbound model, and evaluating the candidate grounded model, to determine if it can be used as the grounded model.

Another aspect provides a method of using a management system for modelling a business process having a number of computer implemented steps using software application components, to enable automatic deployment on a computing infrastructure, the method having the steps of:

inputting to the management system a design for the business process, and causing the system to generate an unbound model of the business process, the unbound model specifying the application components to be used for each of the computer implemented steps of the business process, without a complete design of the computing infrastructure, inputting to the management system a selection of an infrastructure design template having predetermined parts of the computing infrastructure, predetermined relationships between the parts, and having a limited number of options to be completed, causing the system to derive automatically a grounded model of the business process from the unbound model, based on the infrastructure design template, the grounded model specifying a complete design of the computing infrastructure suitable for automatic deployment of the business process, and receiving from the management system, results of monitoring the deployed business process.

The use of an infrastructure design template can reduce the number of options to be evaluated and can help reduce the complexity of the task of generating a grounded model which can be deployed and which makes efficient use of resources. This in turn can help enable a more highly automated method, or can enable more complex business processes to be deployed more efficiently, and managed more efficiently. Embodiments of the invention can have any additional features, without departing from the scope of the claims, and some such additional features are set out in dependent claims and in embodiments described below.

Other aspects can encompass corresponding apparatus or parts of the system such as some of the software for the system and steps by human operators using the system. These aspects are useful to get direct infringement or inducing of direct infringement in cases where the infringers system is partly or largely located remotely and outside the jurisdiction covered by the patent, as is feasible with many such systems, yet the human operator is using the system and gaining the benefit, from within the jurisdiction. Other advantages will be apparent to those skilled in the art, particularly over other prior art. Any of the additional features can be combined together, and combined with any of the aspects, as would be apparent to those skilled in the art. The embodiments are examples only, the scope is not limited by these examples, and many other examples can be conceived within the scope of the claims.

BRIEF DESCRIPTION OF THE FIGURES

Specific embodiments of the invention will now be described, by way of example only, with reference to the accompanying Figures, in which.

DESCRIPTION OF SPECIFIC EMBODIMENTS

Definitions

Figure 1:
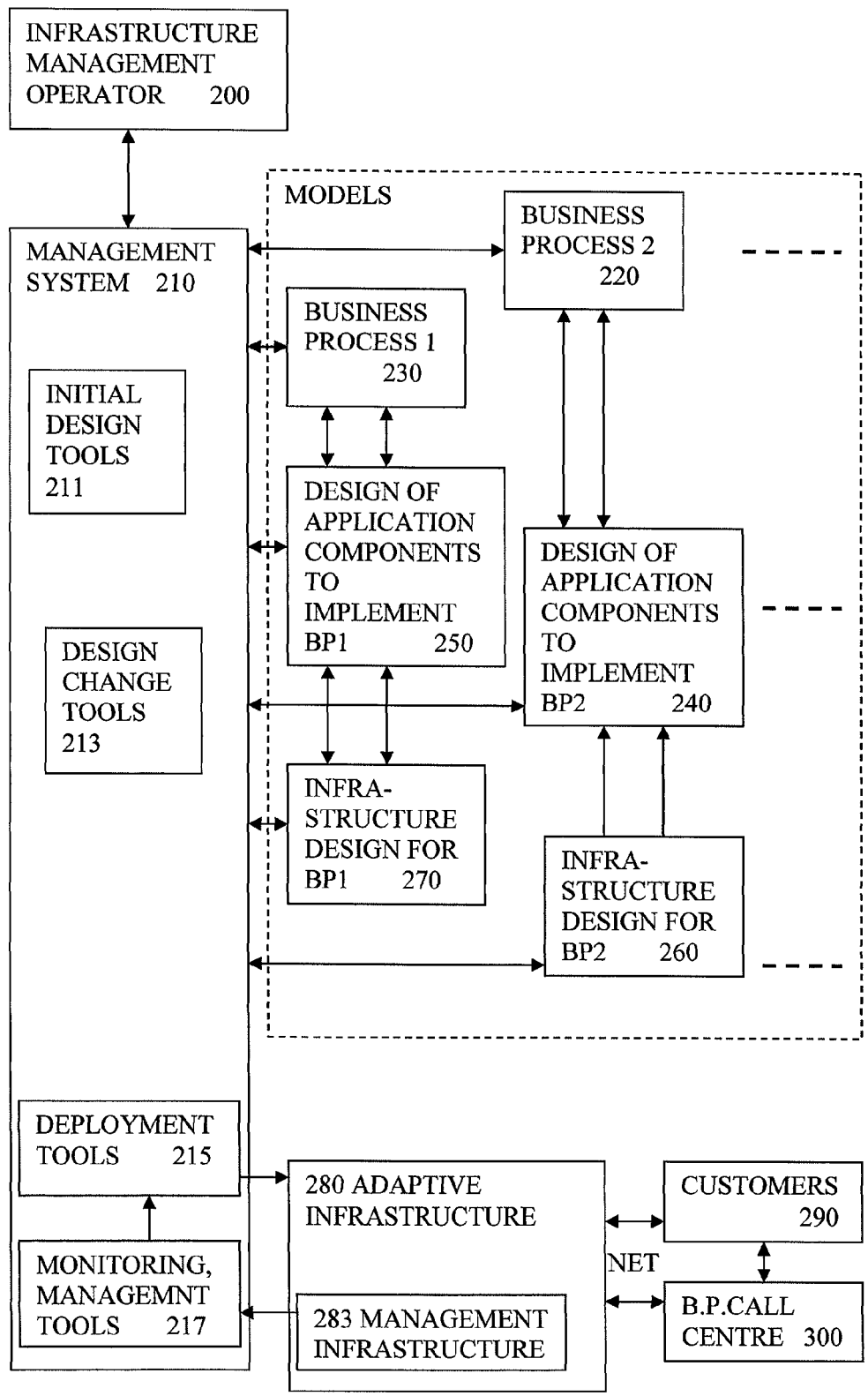
FIG. 1 shows a schematic view of an embodiment showing models, adaptive infrastructure and a management system.

"business process" is intended to encompass any process involving computer implemented steps and other steps such as human input or input from a sensor or monitor for example, for any type of business purpose such as service oriented applications, for sales and distribution, inventory control, control or scheduling of manufacturing processes, or any other process involving computer implemented steps for non business applications such as educational tools, entertainment applications, scientific applications, any type of information processing including batch processing, grid computing, and so on. One or more business process steps can be combined in sequences, loops and branches to form a complete Business Process.

"application components" is intended to encompass any type of software element such as modules, subroutines, code of any amount usable individually or in combinations to implement the computer implemented steps of the business process. It can be data or code that can be manipulated to deliver a business process step (BPStep) such as a transaction or a database table. The Sales and Distribution (SD) product produced by SAP is made up of a number of transactions each having a number of application components for example.

"unbound model" is intended to encompass software specifying in any way, directly or indirectly, at least the application components to be used for each of the computer implemented steps of the business process, without a complete design of the computing infrastructure, and may optionally be used to calculate infrastructure resource demands of the business process, and may optionally contain two or more models.

"grounded model" is intended to encompass software at least specifying in any way, directly or indirectly, a complete design of the computing infrastructure suitable for automatic deployment of the business process. It can be a complete specification of a computing infrastructure and the application components to be deployed on the infrastructure.

"bound model" encompasses any model having a binding of the Grounded Model to physical resources. The binding can be in the form of associations between ComputerSystems, Disks, StorageSystems, Networks, NICS that are in the Grounded Model to real physical parts that are available in the actual computing infrastructure.

"infrastructure design template" is intended to encompass software of any type which determines design choices by indicating in any way at least some parts of the computing infrastructure, and indicating predetermined relationships between the parts. This will leave a limited number of options to be completed, to create a grounded model. These templates can indicate an allowable range of choices or an allowable range of changes for example. They can determine design choices by having instructions for how to create the grounded model, or how to change an existing grounded model.

"computing infrastructure" is intended to encompass any type of resource such as hardware and software for processing, for storage such as disks or chip memory, and for communications such as networking, and including for example servers, operating systems, virtual entities, and management infrastructure such as monitors, for monitoring hardware, software and applications. All of these can be "designed" in the sense of configuring or allocating resources such as processing time or processor hardware configuration or operating system configuration, or disk space, shared between multiple business processes, instantiating software or links between parts for example, the configuring or allocating also encompassing changing existing configurations or allocations.

"parts of the computing infrastructure" is intended to encompass parts such as servers, disks, networking hardware and software for example.

"server" can mean a hardware processor for running application software such as services available to external clients, or a software element forming a virtual server able to be hosted by a hosting entity such as another server, and ultimately hosted by a hardware processor.

"AIService" is an information service that users consume. It implements a business process.

"Service Utility Platform" (SUP) is a service which instantiates sets of virtual machines and virtual networks. These are called farms.

"Application Constraints Model" can mean arbitrary constraints on components in the Customized Process, Application Packaging and Component Performance Models. These constraints can be used by tools to generate additional models as the MIF progresses from left to right.

"ApplicationExecution Component" is for example a (worker) process, thread or servlet that executes an Application component. An example would be a Dialog Work Process, as provided by SAP.

Figure 8:
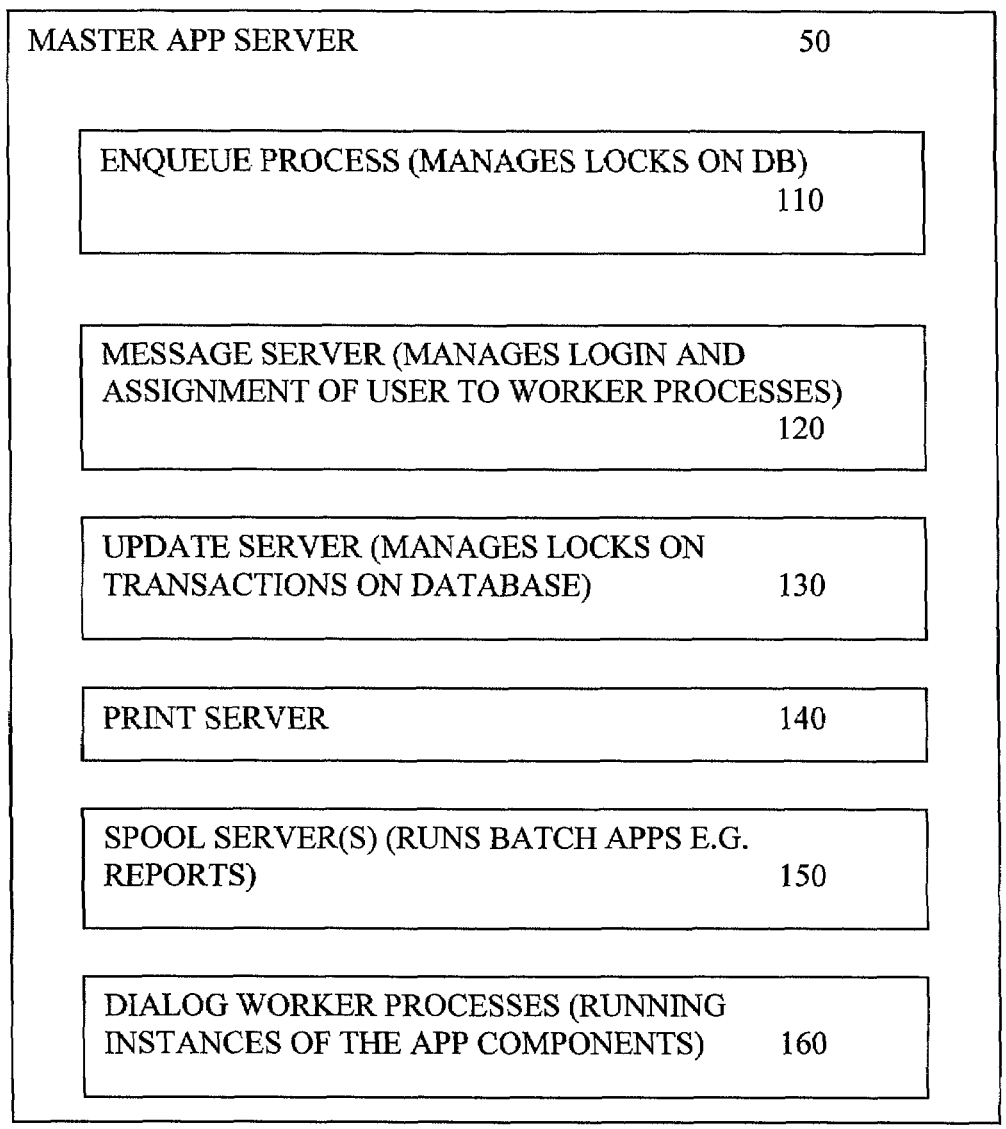
FIG. 8 shows parts of a master application server for the embodiment of FIG. 7.

"ApplicationExecutionService" means a service which can manage the execution of execution components such as Work Processes, servlets or data-base processes. An example would be an Application Server as provided by SAP. Such an application server includes the collection of dialog work processes and other processes such as update and enqueue processes as shown in the diagram of the master application server. (FIG. 8).

"Application Packaging Model" is any model which describes the internal structure of the software: what products are needed and what modules are required from the product, and is typically contained by an unbound model.

"Application Performance Model" means any model which has the purpose of defining the resource demands, direct and indirect, for each Business process (BP) step. It can be contained in the unbound model.

"Component Performance Model" can mean any model containing the generic performance characteristics for an Application Component. This can be used to derive the Application Performance Model (which can be contained in the unbound model), by using the specific Business process steps and data characteristics specified in the Custom Model together with constraints specified in the Application Constraints Model.

"Custom Model" means a customized general model of a business process to reflect specific business requirements.

"Deployed Model" means a bound model with the binding information for the management services running in the system.

"Candidate Grounded Model" can be an intermediate model that may be generated by a tool as it transforms the Unbound Model into the Grounded Model.

"Grounded Component" can contain the installation and configuration information for both Grounded Execution Components and Grounded Execution Services, as well as information about policies and start/stop dependencies.

"Grounded Execution Component" can be a representation in the Grounded Model of a (worker) process, thread or servlet that executes an Application Component.

"Grounded Execution Service" is a representation in the Grounded Model of the entity that manages the execution of execution components such as Work Processes, servlets or database processes.

"Infrastructure Capability Model" can be a catalogue of resources that can be configured by the utility such as different computer types and devices such as firewalls and load balancers.

MIF (Model Information Flow) is a sequence of models used to manage a business process through its entire lifecycle.

In the embodiments described, a general aim is to enable matched changes to all three parts: the business process, the applications used to implement the steps of the business process, and configuration of the computing infrastructure used by the applications. Such changes are to be carried out automatically by use of appropriate software tools interacting with software models modelling the above mentioned parts. Until now there has not been any attempt to link together tools that integrate business process, application and infrastructure management through the entire system lifecycle. Templates sometimes have been used in specific tools to restrict choices. One example is a business process design tool that offers a template business process that a user can modify. Another example is from HP's own Adaptive Infrastructure work where template application configurations are modified according to requirements such as number of users. Another approach is to use constraints which provide the tool and user more freedom. In this approach constraints or rules are specified that the solution must satisfy. One example might be that there has to be at least one application server and at least one database in the application configuration. These constraints on their own do not reduce the complexity sufficiently for typical business processes, because if there are few constraints, then there are a large number of possible designs (also called a large solution space). If there are a large number of constraints (needed to characterize a solution), then searching and resolving all the constraints is really hard—a huge solution space to explore. Also it will take a long time to find which of the constraints invalidates a given possible design from the large list of constraints.

In the embodiments described, the use of templates can help reduce the solution space and can help to avoid the complex task of computing unlimited differences between models when determining how to change an existing deployment. This can make it more feasible to evaluate and deploy and to manage changes automatically.

Additional Features

Some examples of additional features for dependent claims are as follows:

The deriving of the grounded model can be part of an initial deployment of the computer implemented steps of the business process.

The deriving of the grounded model can be part of a method of changing an existing deployment of the business process. This can be a more complex task and commercially more valuable than creating the initial deployment. The existing deployment can be one that was created previously using a template, or in principle could be any existing deployment, in which case a new template would need to be selected or designed.

Where the existing deployment was created using a template, the same template as was used earlier for creating the existing deployment can provided for the step of deriving the grounded model for the method of changing the existing deployment. This can save the step of selecting and trying out different templates to see which suits, and so can reduce the number of options to be selected and tested. Thus again complexity can be reduced, and so costs of managing business processes can be reduced, or more complex business processes can be managed. Templates might also contain instructions for managing change. For example they can contain reconfiguration and instructions that need to be issued to the application components to add a new virtual machine with a new slave application server.

Another such additional feature is the deriving of the grounded model involving specifying all servers needed for the application components. This is part of the design of the adaptive infrastructure and one of the principal determinants of performance of the deployed business process. The template may limit the number or type of servers, to reduce the number of options, to reduce complexity for example.

Another such additional feature is the deriving of the grounded model involving specifying a mapping of each of the application components to a server. This is part of configuring the application components to suit the design of adaptive infrastructure. The template may limit the range of possible mappings, to reduce the number of options, to reduce complexity for example.

Another such additional feature is the deriving of the grounded model having the step of specifying a configuration of management infrastructure for monitoring of the deployed business process in use. This monitoring can be at one or more different levels, such as monitoring the software application components, or the underlying adaptive infrastructure, such as software operating systems, or processing hardware, storage or communications.

Another such additional feature is the step of deriving more than one grounded model, each for deployment of the same business process at different times. This can enable more efficient use of resources for business processes which have time varying demand for those resources for example. Which of the grounded models is deployed at a given time can be switched over any time duration, such as hourly, daily, nightly, weekly, monthly, seasonally and so on. The switching can be at predetermined times, or switching can be arranged according to monitored demand, detected changes in resources, such as hardware failures or any other factor.

Another such additional feature is the unbound model having a complete functional specification for implementing the steps of the business process, and specifying some non functional requirements. These typically can also have a notable effect on performance of the deployed business process.

Another such additional feature is the non functional requirements comprising any one or more of: a number of concurrent users, an indication of desired response time, an availability level, and a security level. These are typically significant for the design of the adaptive infrastructure.

The unbound model can have performance or capacity goals, and the evaluating step can involve simulating the candidate grounded model and comparing the performance or capacity of the simulated candidate grounded model with the goals. This is one way of evaluating, others can be conceived to suit different types of business process.

The adaptable infrastructure can comprise virtualized entities. This is one way of increasing flexibility of allocation of resources, and thus enabling improved efficiency of use of the resources. As more flexibility tends to increase the complexity of the task of infrastructure design, the use of templates is particularly appropriate and valuable in this case, to counteract the disadvantage of design complexity.

Where the adaptable infrastructure has virtualized entities, the deriving of the grounded model can be arranged to specify one or more virtualized entities without indicating how the virtualised entities are hosted. It has now been appreciated that the models and the deriving of them can be simplified by hiding such hosting, since the hosting can involve arbitrary recursion, in the sense of a virtual entity being hosted by another virtual entity, itself hosted by another virtual entity and so on. The template can specify virtual entities, and map application components to such virtual entities, to limit the number of options to be selected, again to reduce complexity. Such templates will be simpler if it does not need to specify the hosting of the virtual entities. The hosting can be defined at some time before deployment, by a separate resource allocation service for example.

The method can have the further step of converting the grounded model to a bound model, by reserving resources in the adaptable infrastructure for deploying the bound model. At this point, the amount of resources needed is known, so it can be more efficient to reserve resources at this time than reserving earlier, though other possibilities can be conceived. If the grounded model is for a change in an existing deployment, the method can have the step of determining differences to the existing deployed model, and reserving only the additional resources needed.

The method can have the further step of deploying the bound model by installing and starting the application components of the bound model. This enables the business process to be used. Again, if the grounded model is for a change in an existing deployment, the method can have the step of determining differences to the existing deployed model, and installing and starting only the additional application components needed.

As will become apparent from the description of the embodiments, two notable points in the modelling philosophy are the use of templates to present a finite catalogue of resources that can be instantiated, and not exposing the hosting relationship for virtualized resources. Either or both can help reduce the complexity of the models and thus enable more efficient processing of the models for deployment or changing after deployment.

Some embodiments can use an infrastructure capability model to present the possible types of resources that can be provided by a computing fabric. An instance of an infrastructure capability model contains one instance for each type of Computer System or Device that can be deployed and configured by the underlying utility computing fabric. Each time the utility deploys and configures one of these types, the configuration will always be the same. For a Computer System this can mean the following for example.
Same memory, CPU, Operating System
Same number of NICs with same I/O capacity
Same number of disks with the same characteristics The embodiments described use template solutions to reduce the complexity of the search space by reducing the number of design options, and make it easier for automatic tools to select an appropriate solution. A tool simply needs to pick a template solution and use some simple guidelines to instantiate the solution. Some examples of these template solutions are described with reference to the Grounded Models described in more detail below.

The templates can map the application components to computers, while the range of both application components and computers is allowed to vary. In addition the templates can also include some or all of the network design, including for example whether firewalls and subnets separate the computers in the solution. In embodiments described below in more detail, the application packaging model together with the custom (business process) model show how the various application components can implement the business process, and are packaged within the Grounded Model.

The template selected can also be used to limit changes to the system, such as changes to the business process, changes to the application components, or changes to the infrastructure, or consequential changes from any of these. This can make the ongoing management of the adaptive infrastructure a more tractable computing problem, and therefore allow more automation and thus reduced costs. In some example templates certain properties have a range: for example 0 to n, or 2 to n. A change management tool (or wizard, or set of tools or wizards) only allows changes to be made to the system that is consistent with template. The template is used by this change management tool to compute the set of allowable changes, it only permits allowable changes. This can help avoid the above mentioned difficulties in computing differences between models of current and next state, if there are no templates to limit the otherwise almost infinite numbers of possible configurations.

Some of the advantages or consequences of these features are as follows:

1. Simplicity: by using templates it becomes computationally tractable to build a linked tool set to integrate business process, application and infrastructure design and management through the entire lifecycle of design, deployment and change.

2. By limiting the number of possible configurations of the adaptive infrastructure, the particular computing problem of having to compute the differences between earlier and later states of complex models is eased or avoided. This can help enable a management system for the adaptive infrastructure which can determine automatically how to evolve the system from an arbitrary existing state to an arbitrary desired changed state. Instead templates fix the set of allowable changes and are used as configuration for a change management tool.

3. The template models formally relate the business process, application components and infrastructure design. This means that designs, or changes, to any one of these can be made dependent on the others for example, so that designs or changes which are inconsistent with the others are avoided.

FIG. 1 Overview

FIG. 1 shows an overview of infrastructure, applications, and management tools and models according to an embodiment. Adaptive infrastructure 280 is coupled typically over the internet to customers 290, optionally via a business process BP call centre 300. A management system 210 has tools and services for managing design and deployment and ongoing changes to deployed business processes, using a number of models. For example as shown, the management system has initial design tools 211, design change tools 213, deployment tools 215, and monitoring and management tools 217. These may be in the form of software tools running on conventional processing hardware, which may be distributed. Examples of initial design tools and design change tools are shown by the services illustrated in FIG. 5 described below.

A high level schematic view of some of the models are shown, for two business processes, there can be many more. Typically the management system belongs to a service provider, contracted to provide IT services to businesses who control their own business processes for their customers. A model 230 of business process 1 is used to develop a design 250 of software application components. This is used to create and infrastructure design 270 for running the application components to implement the business process. This design can then be deployed by the management system to run on the actual adaptive infrastructure, where it can be used for example by customers, a call centre and suppliers (not shown for clarity). Similarly, item 220 shows a model of a second business process, used to develop a design 240 of software application components. This is used to create and infrastructure design 260 for running the application components to implement the second business process. This design can then also be deployed by the management system to run on the actual adaptive infrastructure.

The adaptive infrastructure can include management infrastructure 283, for coupling to the monitoring and management tools 217 of the management system. The models need not be held all together in a single repository, in principle they can be stored anywhere.

FIG. 2 Operation

Figure 2:
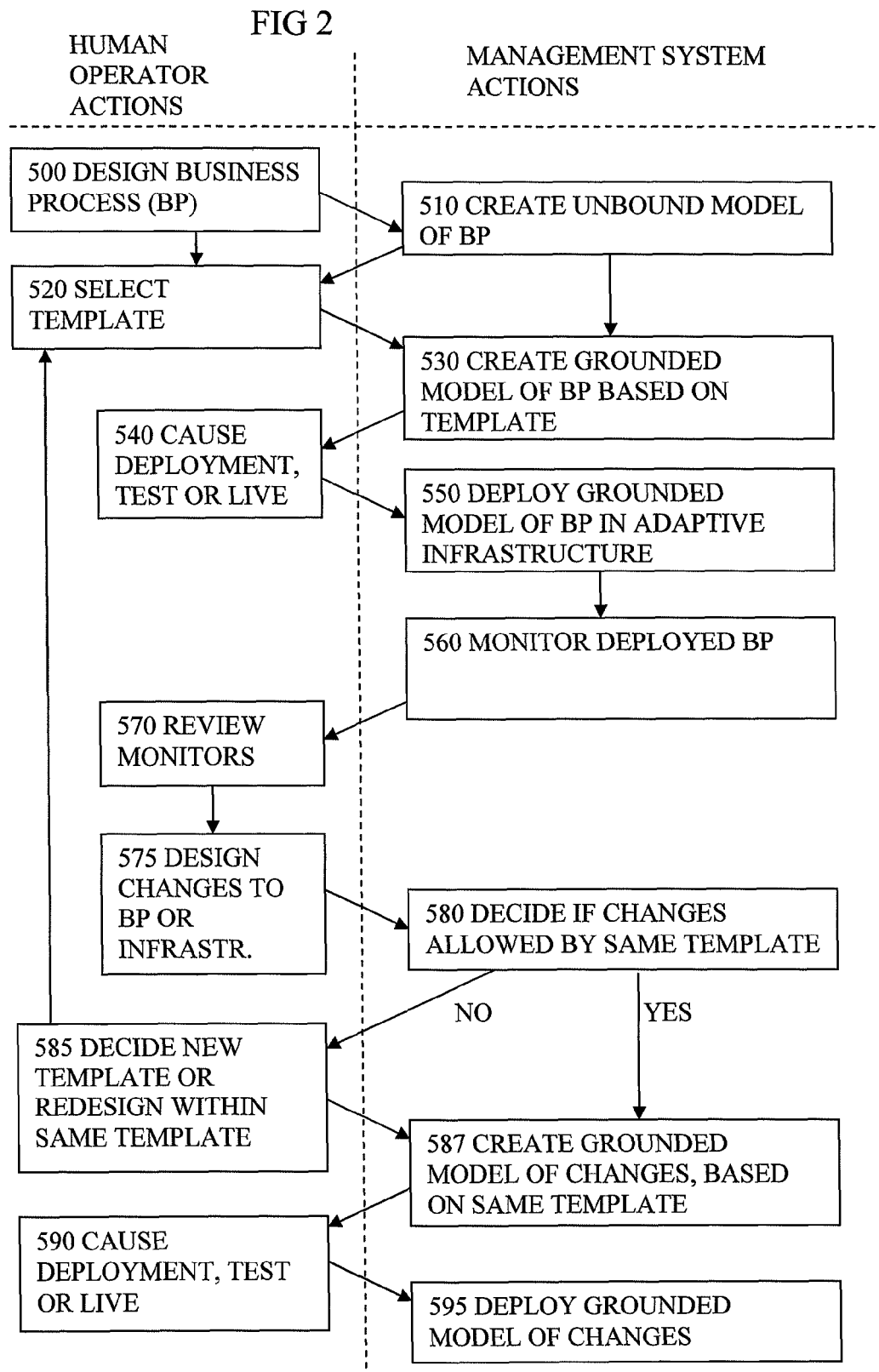
FIG. 2 shows a schematic view of some operation steps by an operator and by the management system, according to an embodiment.

FIG. 2 shows a schematic view of some operation steps by an operator and by the management system, according to an embodiment. Human operator actions are shown in a left hand column, and actions of the management system are shown in the right hand column. At step 500 the human operator designs and inputs a business process (BP). At step 510 the management system creates an unbound model of the BP. At step 520, the operator selects a template for the design of the computing infrastructure. At step 530, the system uses the selected template to create a grounded model of the BP from the unbound model and the selected template. In principle the selection of the template might be automated or guided by the system. The human operator then causes the grounded model to be deployed, either as a live business process with real customers, or as a test deployment under controlled or simulated conditions. The suitability of the grounded model can be evaluated before being deployed as a live business process, an example of how to do this is described below with reference to FIG. 3.

At step 550, the system deploys the grounded model of the BP in the adaptive infrastructure. The deployed BP is monitored by a monitoring means of any type, and monitoring results are passed to the human operator. Following review of the monitoring results at step 570, the operator can design changes to the BP or to the infrastructure at step 575. These are input to the system, and at step 580 the system decides if changes are allowed by the same template. If no, at step 585, the operator decides either for a new template, involving a return to step 520, or for a redesign within the limitations of the same template, involving at step 587 the system creating a grounded model of the changes, based on the same template.

At step 590 the operator causes deployment of the grounded model for test or live deployment. At step 595 the system deploys the grounded model of the changes. In principle the changes could be derived later, by generating a complete grounded model, and later determining the differences, but this is likely to be more difficult.

FIG. 3 Operation

Figure 3:
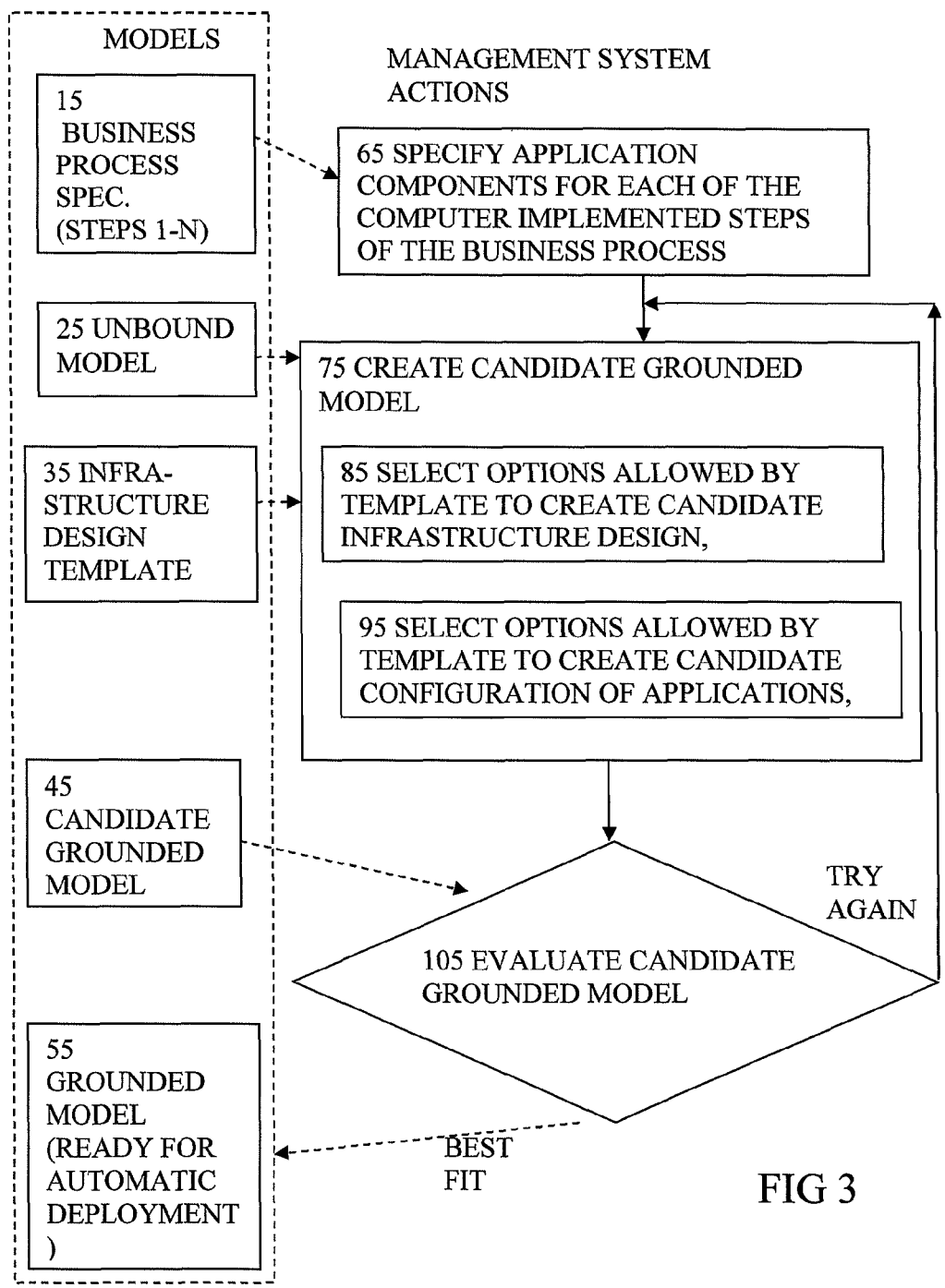
FIG. 3 shows a schematic view of some of the principal actions and models according to an embodiment.

FIG. 3 shows an overview of an embodiment showing some of the steps and models involved in taking a business process to automated deployment. These steps can be carried out by the management system of FIG. 1, or can be used in other embodiments.

A business process model 15 has a specification of steps 1-N. There can be many loops and conditional branches for example as is well known. It can be a mixture of human and computer implemented steps, the human input being by customers or suppliers or third parties for example. At step 65, application components are specified for each of the computer implemented steps of the business process. At step 75, a complete design of computing infrastructure is specified automatically, based on an unbound model 25. This can involve at step 85 taking an infrastructure design template 35, and selecting options allowed by the template to create a candidate infrastructure design. This can include design of software and hardware parts. At step 95, a candidate configuration of software application components allowed by the template is created, to fit the candidate infrastructure design. Together these form a candidate grounded model.

At step 105, the candidate grounded model is evaluated. If necessary, further candidate grounded models are created and evaluated. Which of the candidates is a best fit to the requirements of the business process and the available resources is identified. There are many possible ways of evaluating, and many possible criteria, which can be arranged to suit the type of business process. The criteria can be incorporated in the unbound model for example.

There can be several grounded models each for different times or different conditions. For example, time varying non-functional requirements can lead to different physical resources or even a reconfiguration: a VM might have memory removed out-of-office hours because fewer people will be using it. One might even shutdown an underused slave application server VM. The different grounded models would usually but not necessarily come from the same template with different parameters being applied to generate the different grounded models.

The template, grounded and subsequent models can contain configuration information for management infrastructure and instructions for the management infrastructure, for monitoring the business process when deployed. An example is placing monitors in each newly deployed virtual machine which raise alarms when the CPU utilization rises above a certain level—e.g. 60%.

FIG. 4 MIF

Figure 4:
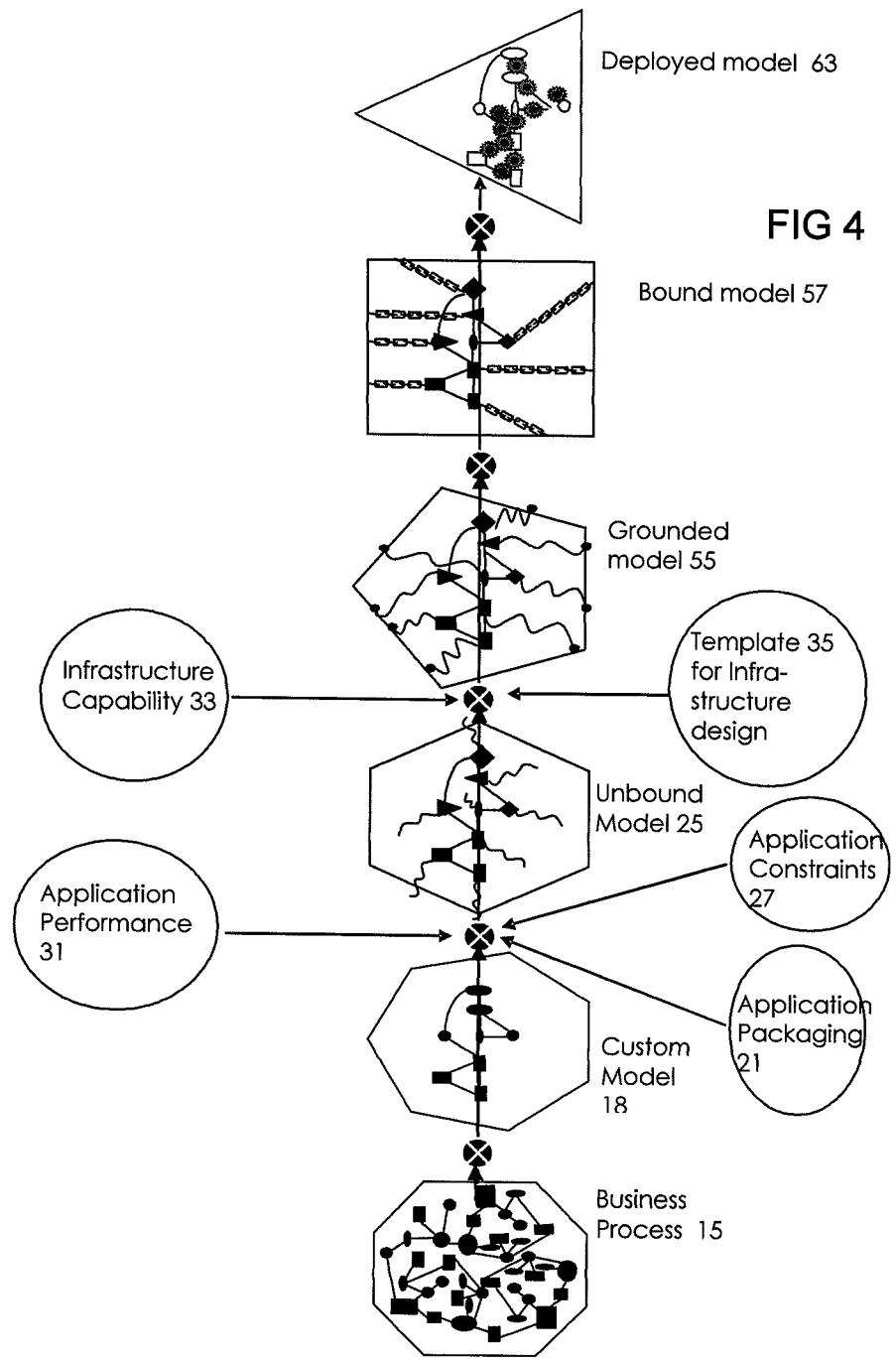
FIG. 4 shows a schematic view of a sequence of steps from business process to deployed model in the form of a model information flow, MIF, according to another embodiment.

FIG. 4 shows some of the principal elements of the MIF involved in the transition from a custom model to a deployed instance. For simplicity, it does not show the many cycles and iterations that would be involved in a typical application lifecycle—these can be assumed. The general model 15 of the business process is the starting point and it is assumed that a customer or consultant has designed a customized business process. That can be represented in various ways, so a preliminary step in many embodiments is customising it. A custom model 18 is a customization of a general model. So it is likely that a General Model could be modelled using techniques similar to the ones demonstrated for modelling the Custom Model: there would be different business process steps. A custom model differs from the general model in the following respects. It will include non-functional requirements such as number of users, response time, security and availability requirements. In addition it can optionally involve rearranging the business process steps: new branches, new loops, new steps, different/replacement steps, steps involving legacy or external systems.

The custom model is converted to an unbound model 25 with inputs such as application performance 31, application packaging 21, and application constraints 27. The unbound model can specify at least the application components to be used for each of the computer implemented steps of the business process, without a complete design of the computing infrastructure. The unbound model is converted to a grounded model 55 with input from models of infrastructure capability 33, and an infrastructure design template 35.

Deployment of the grounded model can involve conversion to a bound model 57, then conversion of the bound model to a deployed model 63. The bound model can have resources reserved, and the deployed model involves the applications being installed and started.

FIG. 5 MIF

Figure 5:
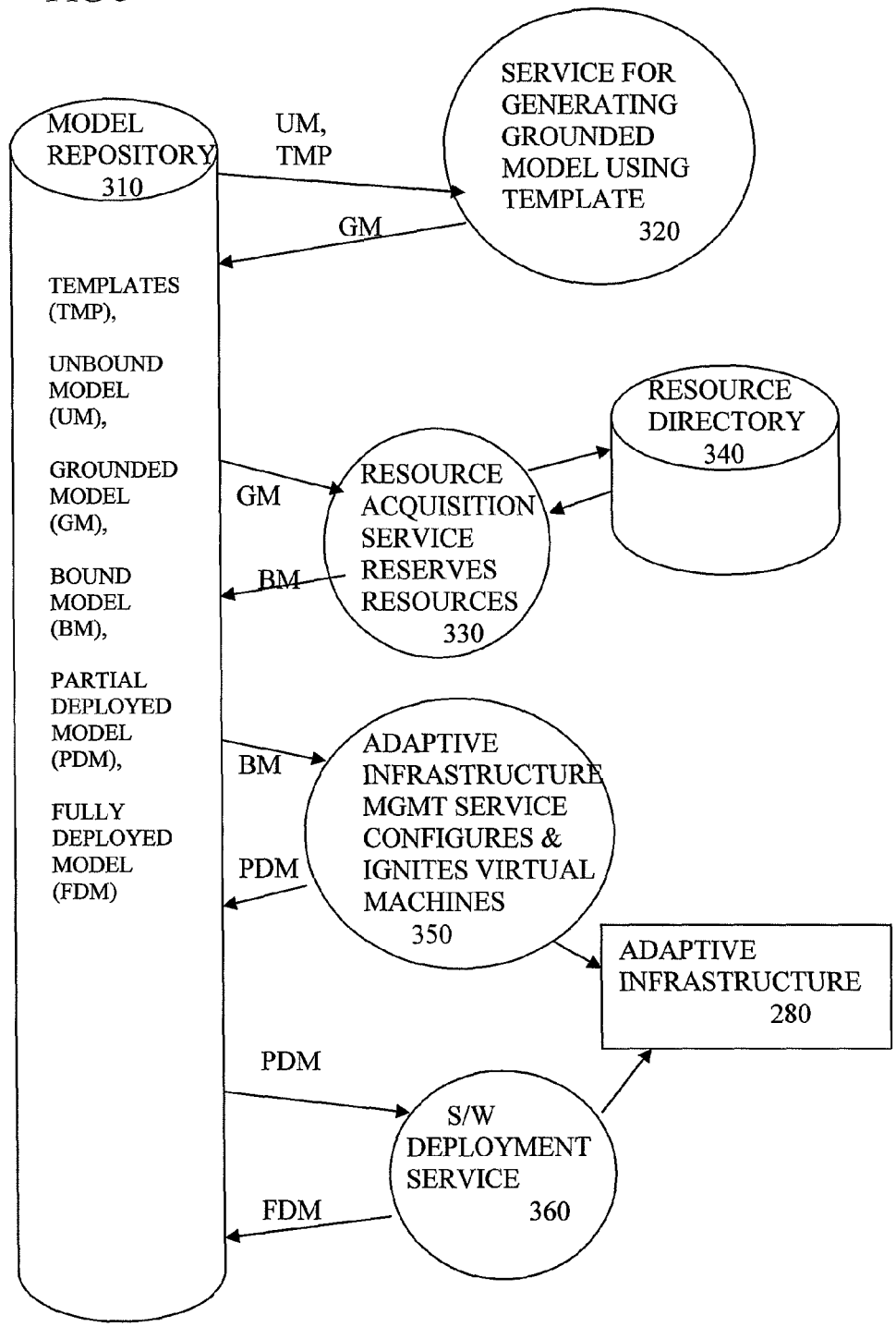
FIG. 5 shows a sequence of steps and models according to another embodiment.

FIG. 5 shows a sequence of steps and models according to another embodiment. This shows a model repository 310 which can have models such as templates (TMP), an unbound model (UM), a bound model (BM), a partial deployed model (PDM), a fully deployed model (FDM). The figure also shows various services such as a service 320 for generating a grounded model from an unbound model using a template. Another service is a resource acquisition service 330 for reserving resources using a resources directory 340, to create a bound model.

An adaptive infrastructure management service 350 can configure and ignite virtual machines in the adaptive infrastructure 280, according to the bound model, to create a partially deployed model. Finally a software deployment service 360 can be used to take a partially deployed model and install and start application components to start the business process, and create a fully deployed model.

Figure 6:
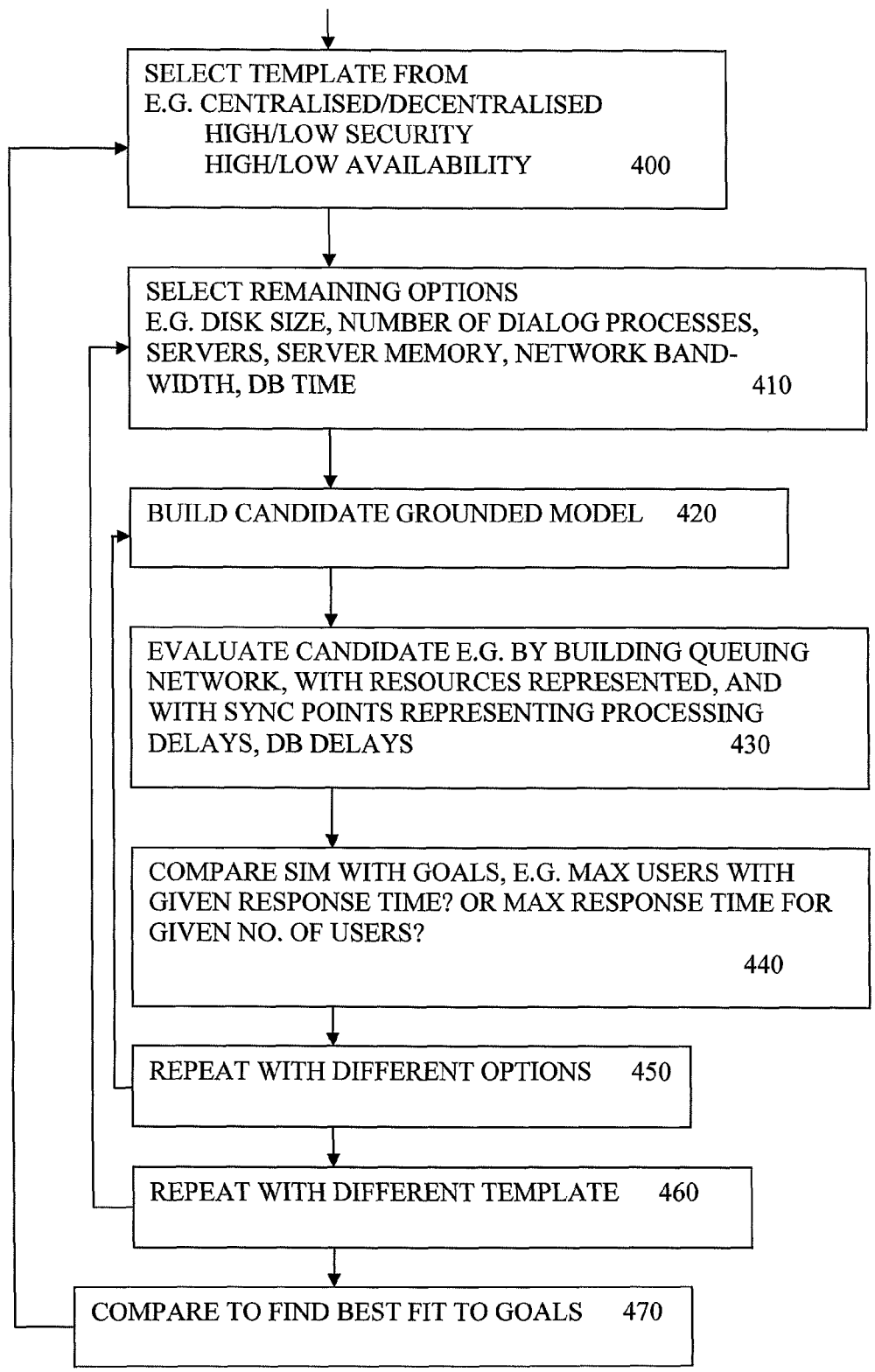
FIG. 6 shows steps in deriving a grounded model according to an embodiment.

FIG. 6 Deriving Grounded Model

FIG. 6 shows steps in deriving a grounded model according to an embodiment. At step 400, a template is selected from examples such as centralised or decentralised arrangements. A centralised arrangement implies all is hosted on a single server or virtual server. Other template choices may be for example high or low security, depending for example on what firewalls or other security features are provided. Other template choices may be for example high or low availability, which can imply redundancy being provided for some or all parts.

At step 410, remaining options in the selected template are filled in. This can involve selecting for example disk sizes, numbers of dialog processes, number of servers, server memory, network bandwidth, server memory, network bandwidth, database time allowed and so on. At step 420, a candidate grounded model is created by the selections. Step 430 involves evaluating the candidate grounded model e.g. by building a queuing network, with resources represented, and with sync points representing processing delays, db delays and so on. Alternatively the evaluation can involve deploying the model in an isolated network with simulated inputs and conditions.

At step 440, the evaluation or simulation results are compared with goals for the unbound model. These can be performance goals such as maximum number of simultaneous users with a given response time, or maximum response time, for a given number of users. At step 450, another candidate grounded model can be created and tested with different options allowed by the template. At step 460 the process is repeated for one or more different templates. At step 470, results are compared to identify which candidate or candidates provides the best fit. More than one grounded model may be selected, if for example the goals or requirements are different at different times for example. In this case, the second or subsequent grounded model can be created in the form of changes to the first grounded model.

Figure 7:
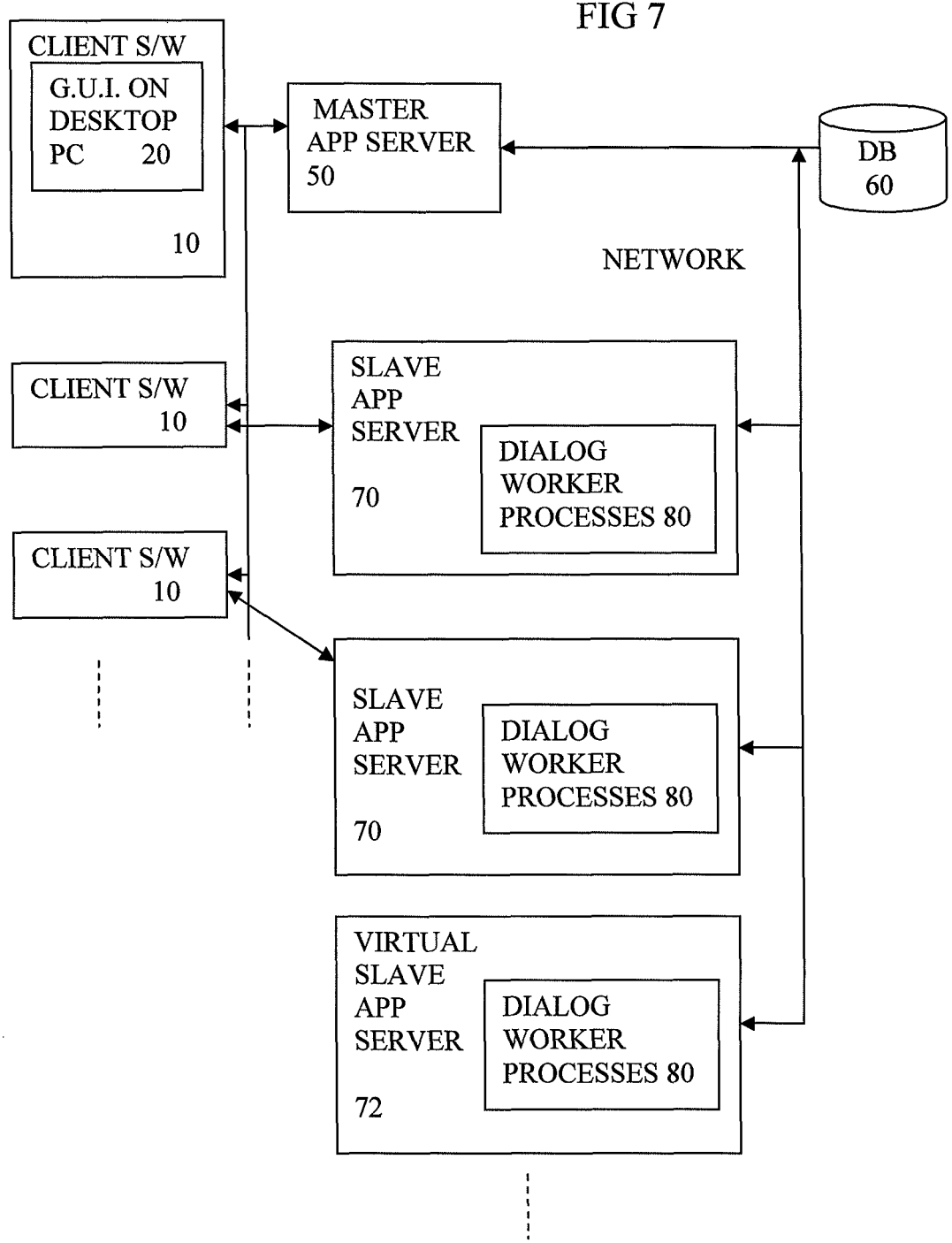
FIG. 7 shows an arrangement of master and slave application servers for a distributed design, according to an embodiment.

FIG. 7 Master and Slave Application Servers

FIG. 7 shows an arrangement of master and slave application servers for a decentralised or distributed design of computing infrastructure, according to an embodiment. A master application server 50 is provided coupled by a network to a database 60, and to a number of slave application servers 70. Each slave can have a number of dialog worker processes 80. The master application server is also coupled to remote users using client software 10. These can each have a graphical user interface GUI on a desktop PC 20 coupled over the internet for example. The slaves can be used directly by the clients once the clients have logged on using the master.

FIG. 8 Master Application Server

FIG. 8 shows parts of a master application server for the embodiment of FIG. 7, An enqueue process 110 is provided to manage locks on the database. A message server 120 is provided to manage login of users and assignment of users to slave application servers for example. An update server is provided for managing committing work to persistent storage in a database. A print server 140 can be provided if needed. A spool server 150 can be provided to run batch tasks such as reports. At 160 dialog worker processes are shown for running instances of the application components.

Figure 9:
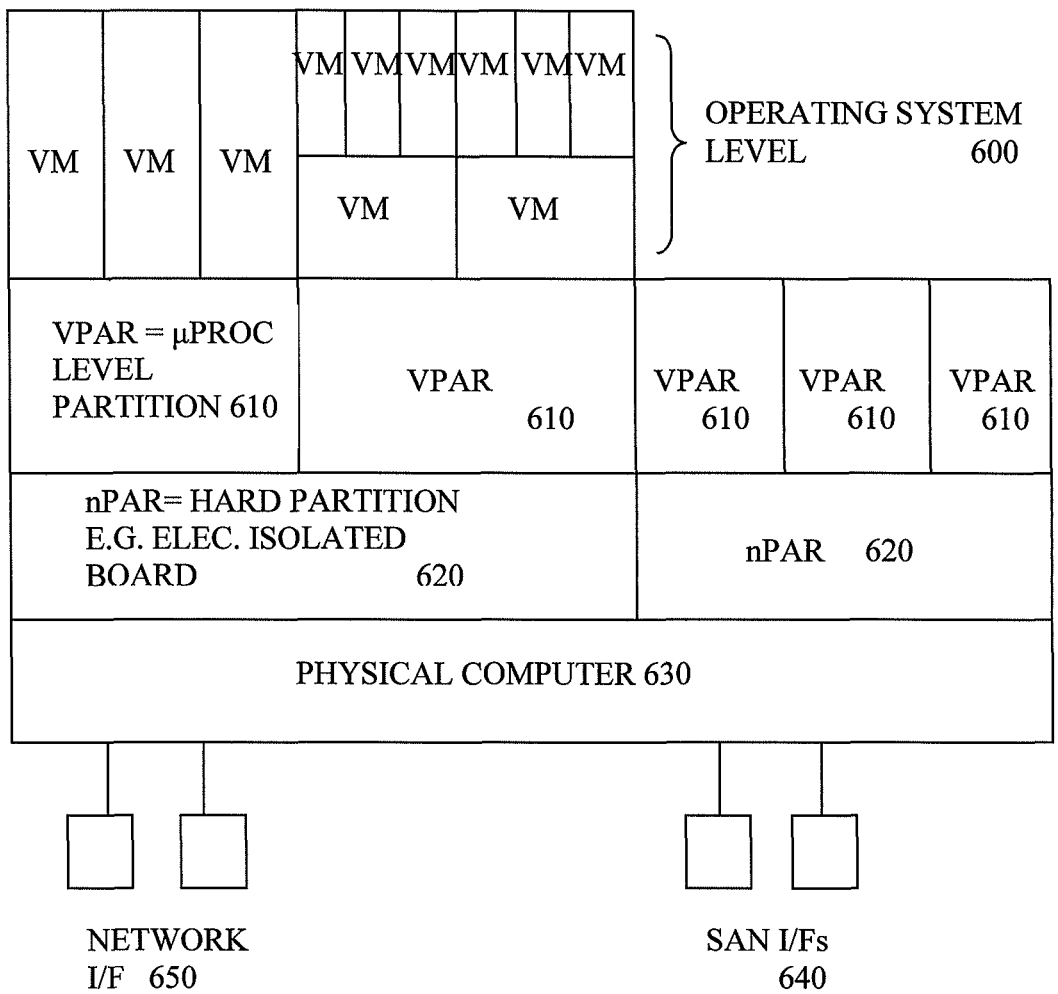
FIG. 9 shows an arrangement of virtual entities on a server, for use in an embodiment.

FIG. 9 Virtual Entities

FIG. 9 shows an arrangement of virtual entities on a server, for use in an embodiment. A hierarchy of virtual entities is shown. At an operating system level there are many virtual machines VM. Some are hosted on other VMs. Some are hosted on virtual partitions VPARs 610 representing a reconfigurable partition of a hardware processing entity, for example by time sharing or by parallel processing circuitry. A number of these may be hosted by a hard partitioned entity nPAR 620 representing for example a circuit board mounting a number of the hardware processing entities. Multiple nPARs make up a physical computer 630 which is typically coupled to a network by network interface 650, and coupled to storage such as via a storage area network SAN interface 640.

FIGS. 10 to 15

The next part of this document describes in more detail with reference to FIGS. 10 to 15 examples of models that can be used within the Model Information Flow (MIF) shown in FIGS. 1 to 9, particularly FIG. 4. These models can be used to manage an SAP application or other business process through its entire lifecycle within a utility infrastructure. The diagrams are shown using the well known UML (Unified Modelling Language) that uses a CIM (common information model) style. The implementation can be in Java or other similar established software languages.

A custom model can have a 1-1 correspondence between an instance of an AIService and a BusinessProcess. The AIService is the information service that implements the business process.

A business process can be decomposed into a number of business process steps (BPsteps), so instances of a BusinessProcess class can contain 1 or more BPSteps. An instance of a BPStep may be broken into multiple smaller BPSteps involving sequences, branches and loops for example. Once the BusinessProcess step is decomposed into sufficient detail, each of the lowest level BPSteps can be matched to an ApplicationComponent. An ApplicationComponent is the program or function that implements the BPStep. For SAP, an example would be the SAP transaction named VA01 in the SD (Sales and Distribution package) of SAP R/3 Enterprise. Another example could be a specific Web Service (running in an Application Server).

BPStep can have stepType and stepParams fields to describe not only execution and branching concepts like higher-level sequences of steps, but also the steps themselves. The stepType field is used to define sequential or parallel execution, loops, and if-then-else statements. The stepParams field is used to define associated data. For example, in the case of a loop, the stepParams field can be the loop count or a termination criterion. The set of BPSteps essentially describes a graph of steps with various controls such as loops, if-then-else statements, branching probabilities, etc. The exact definition and possible values of stepType and stepParams fields is to be defined.

The relation BPStepsToApplicationComponentMapping is a complex mapping that details how the BPStep is mapped to the ApplicationComponent. It represents, in a condensed form, a potentially complex mix of invocations on an Application Component by the BPStep, such as the specific dialog steps or functions invoked within the ApplicationComponent or set of method calls on a Web Service, and provided details of parameters, such as the average number of line items in a sales order.

A BPStep may have a set of non-functional requirements (NonFunctionalRequirements) associated with it: performance; availability and security. In the current version availability and security requirements are modelled by a string: "high", "medium", "low". Performance requirements are specified in terms of for example a number of registered users (NoUsersReq), numbers of concurrent users of the system, the response time in seconds and throughput requirement for the number of transactions per second. Many BPSteps may share the same set of non-functional requirements. A time function can be denoted by a string. This specifies when the non-functional requirements apply, so different requirements can apply during office-hours to outside of normal office hours. Richer time varying functions are also possible to capture end of months peaks and the like.

Figure 10:
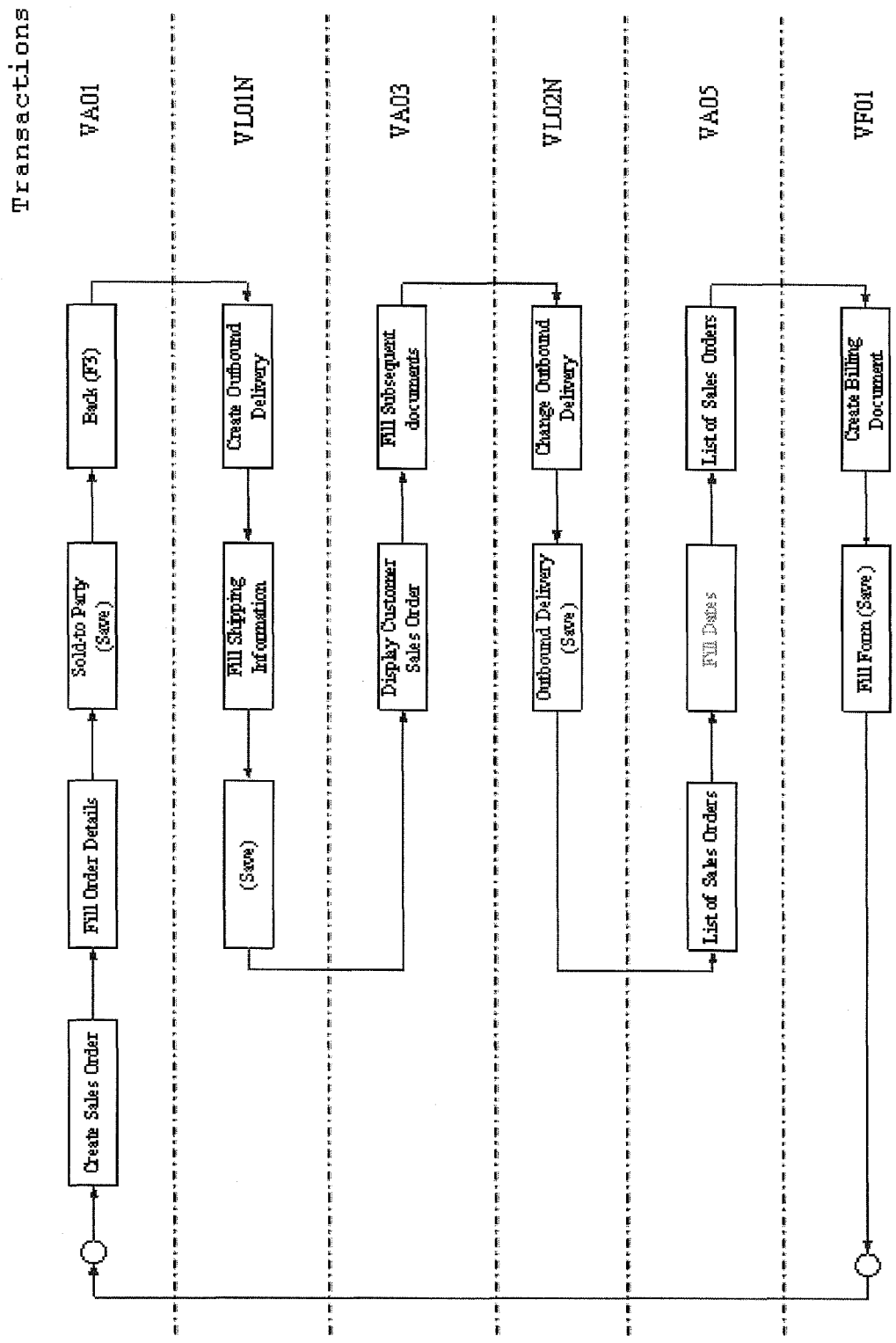
FIG. 10 shows an example of a sales and distribution business process (SD) Benchmark Dialog Steps and Transactions.
Figure 11:
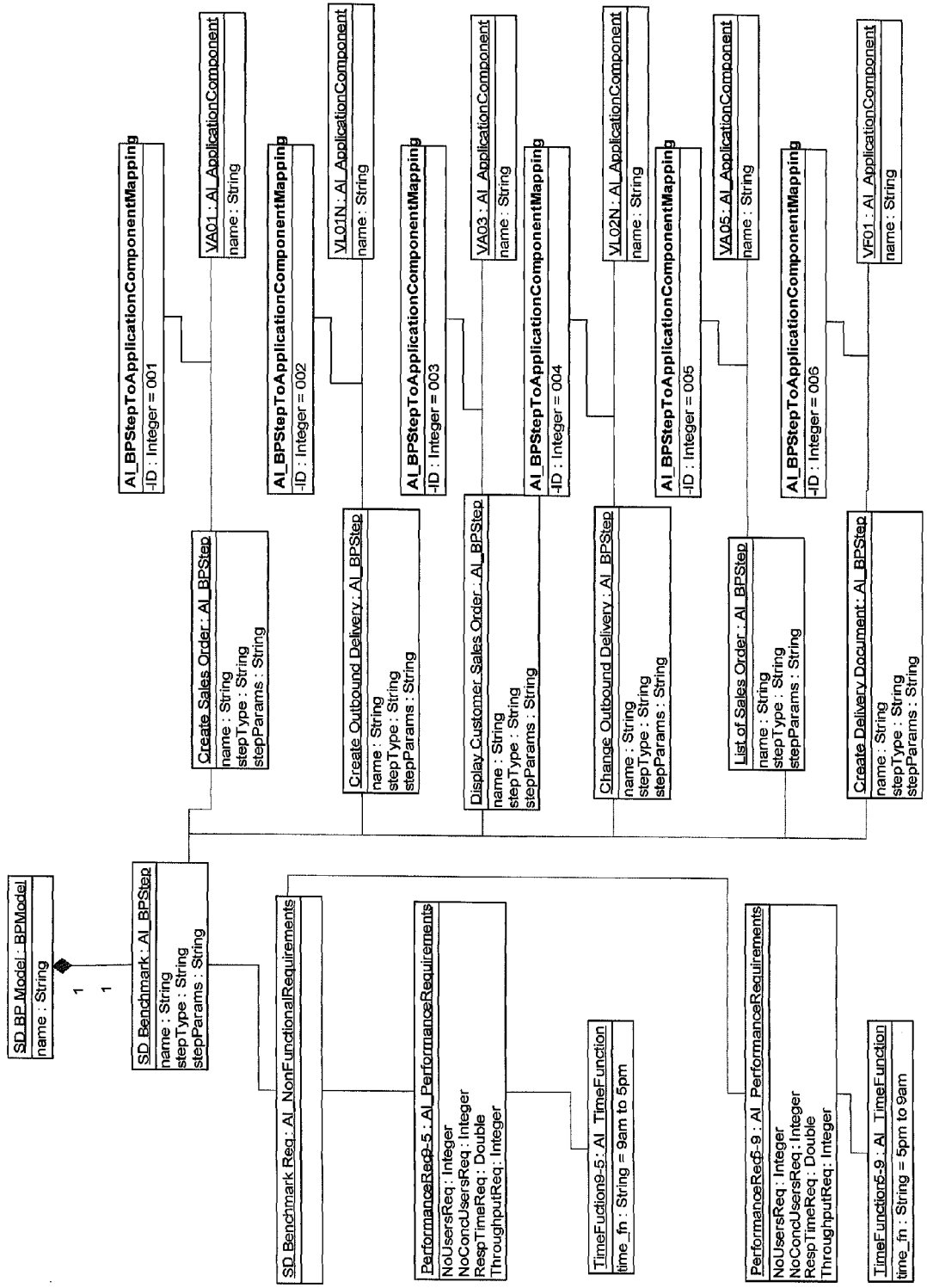
FIG. 11 shows an example Custom Model Instance for SD Benchmark.

FIGS. 10, 11 Custom Model

For an example of a Custom Model the well-known Sales and Distribution (SD) Benchmark will be discussed. This is software produced by the well known German company SAP. It is part of the SAP R/3 system, which is a collection of software that performs standard business functions for corporations, such as manufacturing, accounting, financial management, and human resources. The SAP R/3 system is a client server system able to run on virtually any hardware/software platform and able to use many different database management systems. For example it can use an IBM AS/400 server running operating system OS/400 using database system DB2; or a Sun Solaris (a dialect of Unix) using an Oracle database system; or an IBM PC running Windows NT using SQL Server.

SAP R/3 is designed to allow customers to choose their own set of business functions, and to customize to add new database entities or new functionality. The SD Benchmark simulates many concurrent users using the SD (Sales and Distribution) application to assess the performance capabilities of hardware. For each user the interaction consists of 16 separate steps (Dialog Steps) that are repeated over and over. The steps and their mapping to SAP transactions are shown in FIG. 10. A transaction here is an example of an Application Component. Each transaction is shown as a number of boxes in a row. A first box in each row represents a user invoking the transaction e.g. by typing/nva01 to start transaction VA01. As shown in FIG. 10, transaction VA01 in the top row involves the business process steps of invoking the create sales order transaction, then filling order details, then saving the sold-to party, and completing with the "back" function F3 which saves the data. A next transaction VL01N is shown in the second row, and involves steps as follows to create an outbound delivery. The transaction is invoked, shipping information is filled in, and saved. A next transaction VA03 is shown in the third row for displaying a customer sales order. This involves invoking the transaction, and filling subsequent documents. A fourth transaction is VL02N in the fourth row, for changing an outbound delivery. After invoking this transaction, the next box shows saving the outbound delivery. A next transaction shown in the fifth row is VA05, for listing sales orders. After invoking this transaction, the next box shows prompting the user to fill in dates and then a third box shows listing sales orders for the given dates. Finally, in a sixth row, the transaction VF01 is for creating a billing document, and shows filling a form and saving the filled form.

FIG. 11 shows an example of a custom model instance for the SD Benchmark. The top box indicates that the business process "BPModel" contains one top level BPStep: "SD Benchmark", with stepType=Sequence. Two lines are shown leading from this box, one to the non-functional requirements associated with this top-level BPStep, and shown by the boxes at the left hand side. In this particular case only performance requirements have been specified—one for 9 am-5 pm and the other for 5 pm-9 am. Other types of non-functional requirements not shown could include security or availability requirements for example. In each case the performance requirements such as number of users, number of concurrent users, response time required, and throughput required, can be specified as shown. These are only examples, other requirements can be specified to suit the type of business process. A box representing the respective time function is coupled to each performance requirement box as shown. One indicates 9 am to 5 pm, and the other indicates 5 pm to 9 am in this example.

On the right hand side a line leads from the SD Benchmark BPStep to the functional requirements shown as six BPSteps, with stepType=Step—one for each SAP transaction shown in FIG. 10 (VA01, VL01N, etc). For convenience the name of the first dialog step for each transaction shown in FIG. 10 is used as the name of the corresponding BPStep shown in FIG. 11 ("Create sales order", "Create outbound delivery", "Display customer sales order", "Change outbound delivery", "List sales order", and "Create delivery document"). For each of these steps the BPStepToApplicationComponentMapping relation specifies the details of the dialog steps involved. For example in the case of CreateSalesOrder, FIG. 10 shows that the BPStepToApplicationComponentMapping needs to specify the following dialog steps are executed in order: "Create Sales Order", "Fill Order Details", "Sold to Party" and "Back". In addition it might specify the number of line items needed for "Fill Order Details". At the right hand side of the figure, each BP step is coupled to an instance of its corresponding ApplicationComponent via the respective mapping. So BPstep "Create Sales order" is coupled to ApplicationComponent VA01, via mapping having ID:001. BPstep "Create outbound delivery" is coupled to ApplicationComponent VL01N via mapping having ID:002. BPstep "Display customer sales order" is coupled via mapping having ID:003 to ApplicationComponent VA03. BPstep "Change outbound delivery" is coupled via mapping having ID:004 to ApplicationComponent VL02N. BPstep "List sales order" is coupled via mapping having ID:005 to ApplicationComponent VA05. BPstep "Create delivery document" is coupled via mapping having ID:006 to ApplicationComponent VF01.

Figure 12:
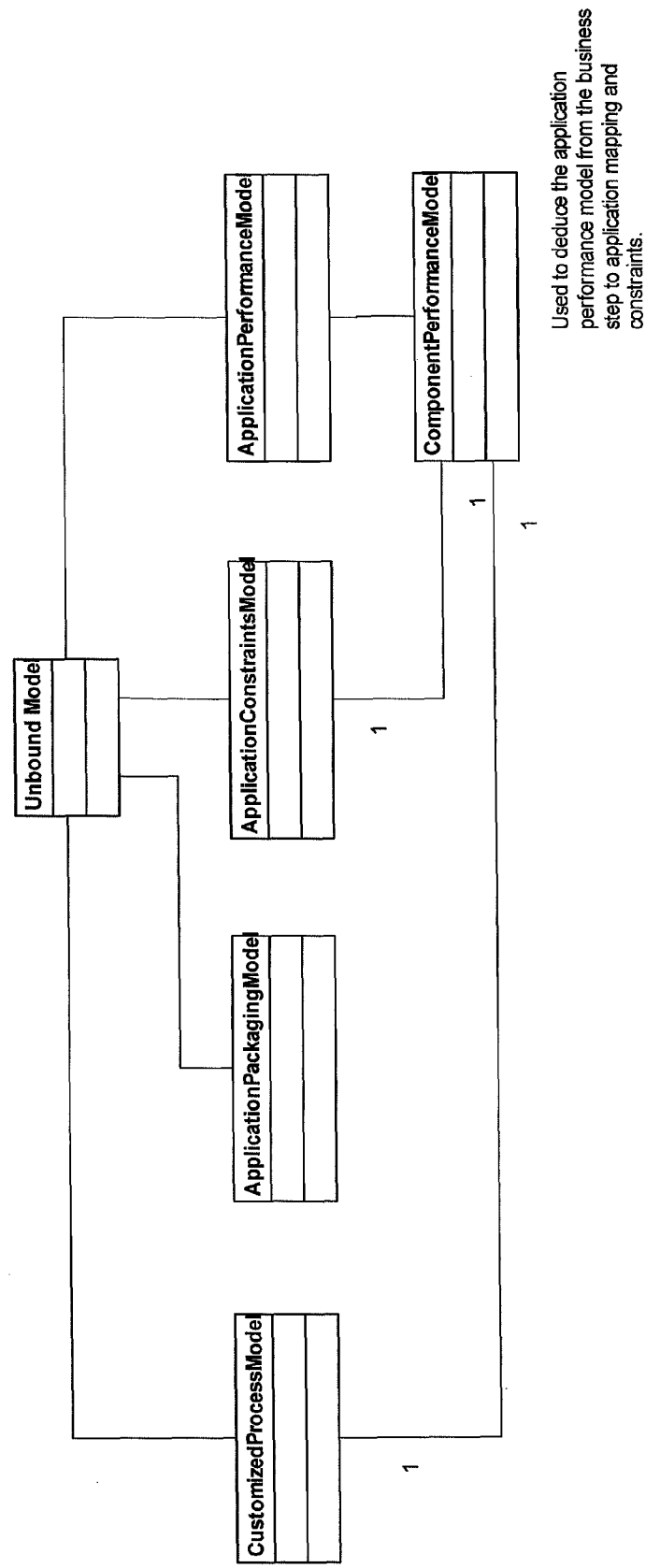
FIG. 12 shows a class diagram for an Unbound Model Class.

FIG. 12 The Unbound Model

The Unbound Model is used to calculate resource demands. As shown in FIG. 12 this model can be made up of four models: the Custom Model (labelled CustomizedProcessingModel), Application Packaging, Application Constraints and Application Performance models, an example of each of which will be described below (other than the Custom Model, an example of which has been described above with respect to FIG. 11). Other arrangements can be envisaged. No new information is introduced that is not already contained in these four models.

FIG. 12, Application Packaging Model

The Application Packaging Model describes the internal structure of the software: what products are needed and what modules are required from the product. An ApplicationComponent can be contained in an ApplicationModule. An ApplicationModule might correspond to a JAR (Java archive) file for an application server, a table in a database. In the case of SAP it might be the module to be loaded from a specific product into an application server such as SD or FI (Financials). The application packaging model can have a DiskFootPrint to indicate the amount of disk storage required by the ApplicationModule. In the case of the ApplicationComponent VA01 in FIG. 10, it is from SD with a DiskFootPrint of 2 MB for example.

One or more ApplicationModules are contained within a product. So for example SAP R/3 Enterprise contains SD. ApplicationModules can be dependent on other ApplicationModules. For example the SD Code for the Application Server depends on both the SD Data and the SD Executable code being loaded into the database.

The custom model can have an ApplicationExecution Component for executing an ApplicationComponent. This could be a servlet running in an application server or a web server. It could also be a thread of a specific component or a process. In the case of SD's VAO1 transaction it is a Dialog Work Process. When it executes, the ApplicationComponent may indirectly use or invoke other Application-Components to run: a servlet may need to access a database process; SD transactions need to access other ApplicationComponents such as the Enqueue Work Process and the Update Work Process, as well as the Database ApplicationExecutionComponent. The ApplicationExecution Component can have an ApplicationExecutionService (SAP application server) which loads or contains ApplicationModules (SD) and manages the execution of ApplicationExecutionComponents (Dialog WP) which, in turn, execute the ApplicationComponent (VA01) to deliver a BPStep.

FIG. 12, Application Constraints Model

The Application Constraints Model expresses arbitrary constraints on components in the Customized Process, Application Packaging and Component Performance Models. These constraints are used by tools to generate additional models as the MIF progresses from left to right. Examples of constraints include:

How to scale up an application server—what ApplicationExecutionComponents are replicated and what are not. For example, to scale up an SAP application server to deal with more users one cannot simply replicate the first instance—the master application server 50 of FIGS. 7 and 8, commonly known as the Central Instance. Instead a subset of the components within the Central Instance is needed. This is also an example of design practice, there may be other constraints encoding best design practice.

Installation and configuration information for Application-Components, ApplicationExecutionComponents and ApplicationExecutionServices Performance constraints on ApplicationExecutionServices—e.g. do not run an application server on a machine with greater than 60% CPU utilization Other examples of constraints include ordering: the database needs to be started before the application server. Further constraints might be used to encode deployment and configuration information. The constraints can be contained all in the templates, provided in addition to the templates, to further limit the number of options for the grounded model.

FIG. 12, Application Performance Model

The purpose of the Application Performance Model is to define the resource demands for each BPStep. There are two types of resource demand to consider.

1. The demand for resources generated directly by the ApplicationExecutionComponent (e.g. Dialog WP) using CPU, storage I/O, network I/O and memory when it executes the BPStep—the ComponentResourceDemand
2. The demand for resources generated by components that the above ApplicationExecutionComponent when it uses, calls or invokes other components (e.g. a Dialog WP using an Update WP)—the IndirectComponentResourceDemand The IndirectComponentResourceDemand is recursive. So there will be a tree like a call-graph or activity-graph.

A complete Application Performance Model would contain similar information for all the BPSteps shown in FIG. 11. For example the set of dialog steps in the BPStep "Create Sales Order" might consume 0.2 SAPS. Further it consists of 4 separate invocations (or in SAP terminology Dialog Steps). The calls are synchronous.

The following are some examples of attributes that can appear in IndirectComponentResourceDemands and ComponentResourceDemands.

delayProperties: Any delay (e.g. wait or sleep) associated with the component's activity which does not consume any CPU, NetIOProperties and DiskIOProperties.

NumInvocation: The number of times the component is called during the execution of the BPStep.

InvocationType: synchronous if the caller is blocked; asynchronous if the caller can immediately continue activity.

BPStepToAppCompID: This is the ID attribute of the BPStepToApplicationComponent-Mapping. The reason for this is that a particular ApplicationExecutionComponent is likely to be involved in several different BPSteps.

ApplicationEntryPoint: This is the program or function being executed. In the case of "Create Sales Order" this VA01 for the DialogWP. It could also be a method of a Web Service.

CPUProperties can be expressed in SAPs or in other units. There are various ways to express MemProperties, NetIOProperties and DiskIOProperties.

FIG. 12, Component Performance Model

There is one instance of an Application Performance Model for each instance of a Custom Model. This is because, in the general case, each business process will have unique characteristics: a unique ordering of BPSteps and/or a unique set of data characteristics for each BPStep. The DirectComponentResourceDemands and IndirectComponentResourceDe-mands associations specify the unique resource demands for each BPStep. These demands need to be calculated from known characteristics of each ApplicationComponent derived from benchmarks and also traces of installed systems.

The Component Performance Model contains known performance characteristics of each ApplicationComponent. A specific Application Performance Model is calculated by combining the following:

The information contained in the BPStepToApplicationComponentMapping associations in the Custom Model
Any performance related constraints in the Application Constraints Model
The Component Performance Model Taken together, the models of the Unbound Model specify not only the non-functional requirements of a system, but also a recipe for how to generate and evaluate possible software and hardware configurations that meet those requirements. The generation of possible hardware configurations is constrained by the choice of infrastructure available from a specific Infrastructure Provider, using information in an Infrastructure Capability Model, and by the selected template.

A general principle that applies to deployable software elements described in the Unbound Model, such as the ApplicationExecutionComponent or ApplicationExecutionService, is that the model contains only the minimum number of instances of each type of element necessary to describe the structure of the application topology. For example, in the case of SD only a single instance of a Dialog Work Process ApplicationExecutionComponent associated with a single instance of an Application Server ApplicationExecutionService is needed in the Unbound Model to describe the myriad of possible ways of instantiating the grounded equivalents of both elements in the Grounded Model. It is the template and packaging information that determines exactly how these entities can be replicated and co-located.

The Infrastructure Capability Model

As discussed above, two notable features of the modelling philosophy described are:

1. Present a template having a finite catalogue of resources that can be instantiated, so that there are a fixed and finite number of choices. For example, small-xen-vm 1-disk, medium-xen-vm 2-disk, large-xen-vm 3-disk, physical-hpux-machine etc. This makes the selection of resource type by any capacity planning tool simpler. It also makes the infrastructure management easier as there is less complexity in resource configuration—standard templates can be used.
2. Do not expose the hosting relationship for virtualized resources. The DMTF Virtualization System Profile models hosting relationship as a "HostedDependency" association. This does not seem to be required if there is only a need to model a finite number of resource types, so it does not appear in any of the models discussed here. This keeps the models simpler since there is no need to deal with arbitrary recursion. It does not mean that tools that process these models can't use the DMTF approach internally if that is convenient. It may well be convenient for a Resource Directory Service and Resource Assignment Service to use this relationship in their internal models.

An instance of an infrastructure capability model contains one instance for each type of ComputerSystem or Device that can be deployed and configured by the underlying utility computing fabric. Each time the utility deploys and configures one of these types the configuration will always be the same. For a ComputerSystem this means the following.

Same memory, CPU, Operating System

Same number of NICs with same I/O capacity

Same number of disks with the same characteristics

Figure 13:
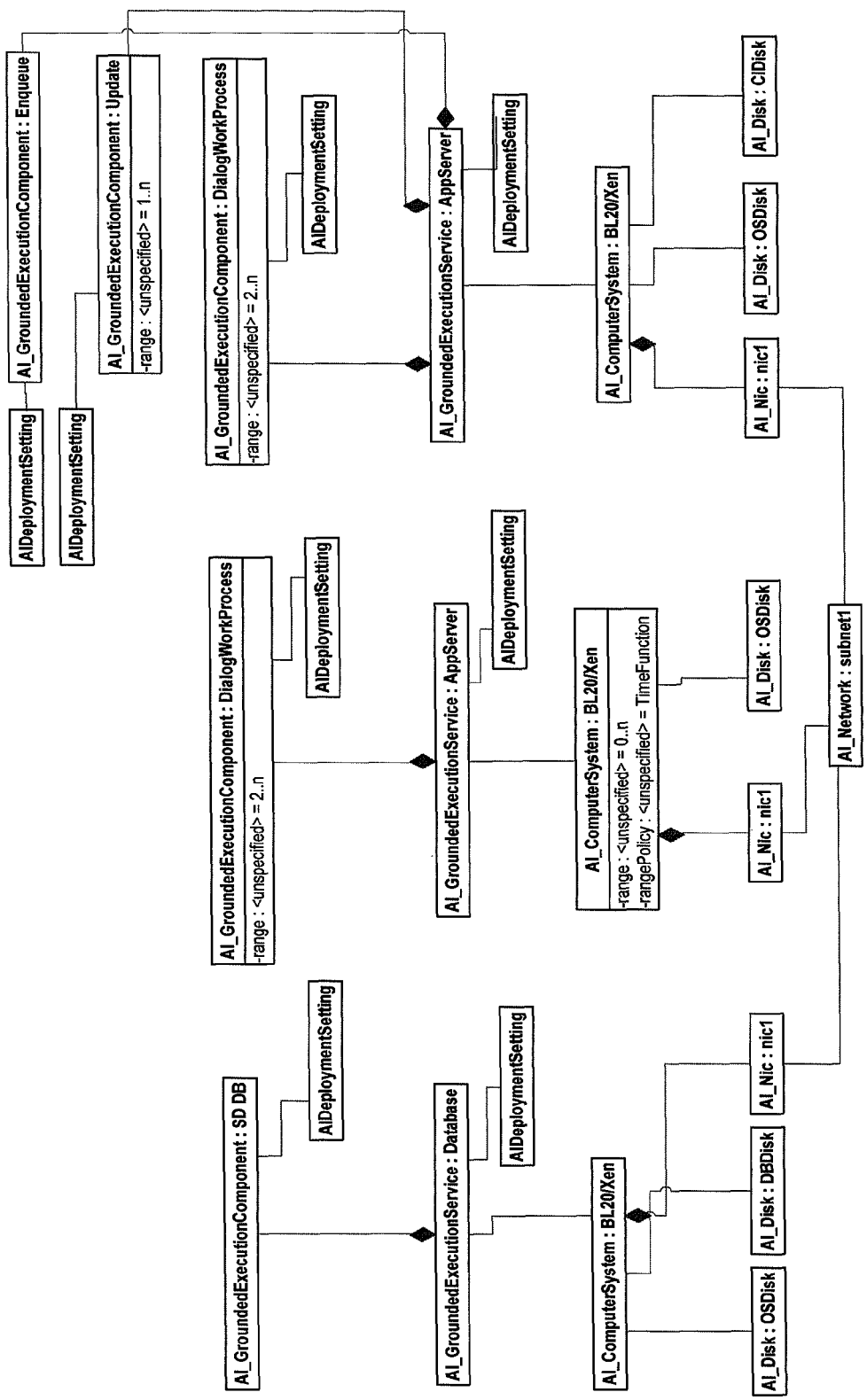
FIG. 13 shows an example of a template suitable for a decentralised SD example.

FIG. 13 Template Example

FIG. 13 shows an example of an infrastructure design template having predetermined parts of the computing infrastructure, predetermined relationships between the parts, and having a limited number of options to be completed. In this case it is suitable for a decentralised SD business process, without security or availability features. The figure shows three computer systems coupled by a network labelled "AI_network", the right hand of the three systems corresponding to a master application server, and the central one corresponds to slave application servers as shown in FIG. 7. Hence it is decentralized. AI is an abbreviation of Adaptive Infrastructure. The left hand one of the computer systems is for a database. The type of each computer system is specified, in this case as a BL20/Xen. The central one, corresponding to slave application servers has an attribute "range=0 . . . n. This means the template allows any number of these slave application servers.

The master application server is coupled to a box labelled AI_GroundedExecutionService:AppServer, indicating it can be used to run such a software element. It has an associated AIDeploymentSetting box. The AI_GroundedExecutionService:AppServer is shown as containing three components, labelled AI_GroundedExecutionComponents, and each having an associated AIDeploymentSetting box. A first of these components is a dialog work process, for executing the application components of steps of the business process, another is an update process, responsible for committing work to persistent storage, and another is an enqueue process, for managing locks on a database. As shown, the range attribute is 2 . . . n for the update and the dialog work process, meaning multiple instances of these parts are allowed.

The slave application server has a GroundedExecutionService having only one type of AI_GroundedExecutionComponent for any number of dialog work processes. The slave application server is shown having a rangePolicy=Time function, meaning it is allowed to be active at given times. Again the service and the execution component each have an associated AIDeploymentSetting box.

The master and slave application servers and the database computer system have an operating system shown as AI_disk: OSDisk. The master application server is shown with an AI_Disk: CIDisk as storage for use by the application components. For the network, each computer system has a network interface shown as AI_Nic1, coupled to the network shown by AI_Network:subnet1.

The database computer system is coupled to a box labelled AI_GroundedExecutionService: Database, which has only one type of AI_GroundedExecutionComponent, SD DB for the database. Again the service and the execution component each have an associated AIDeploymentSetting box. AIDeploymentSetting carries the configuration and management information used to deploy, configure, start, manage and change the component. Further details of an example of this are described below with reference to FIG. 14. This computer system is coupled to storage for the database labelled AI_Disk: DBDisk.

Optionally the template can have commands to be invoked by the tools, when generating the grounded model, or generating a changed grounded model to change an existing grounded model. Such commands can be arranged to limit the options available, and can use as inputs, parts of the template specifying some of the infrastructure design. They can also use parts of the unbound model as inputs.

Figure 14:
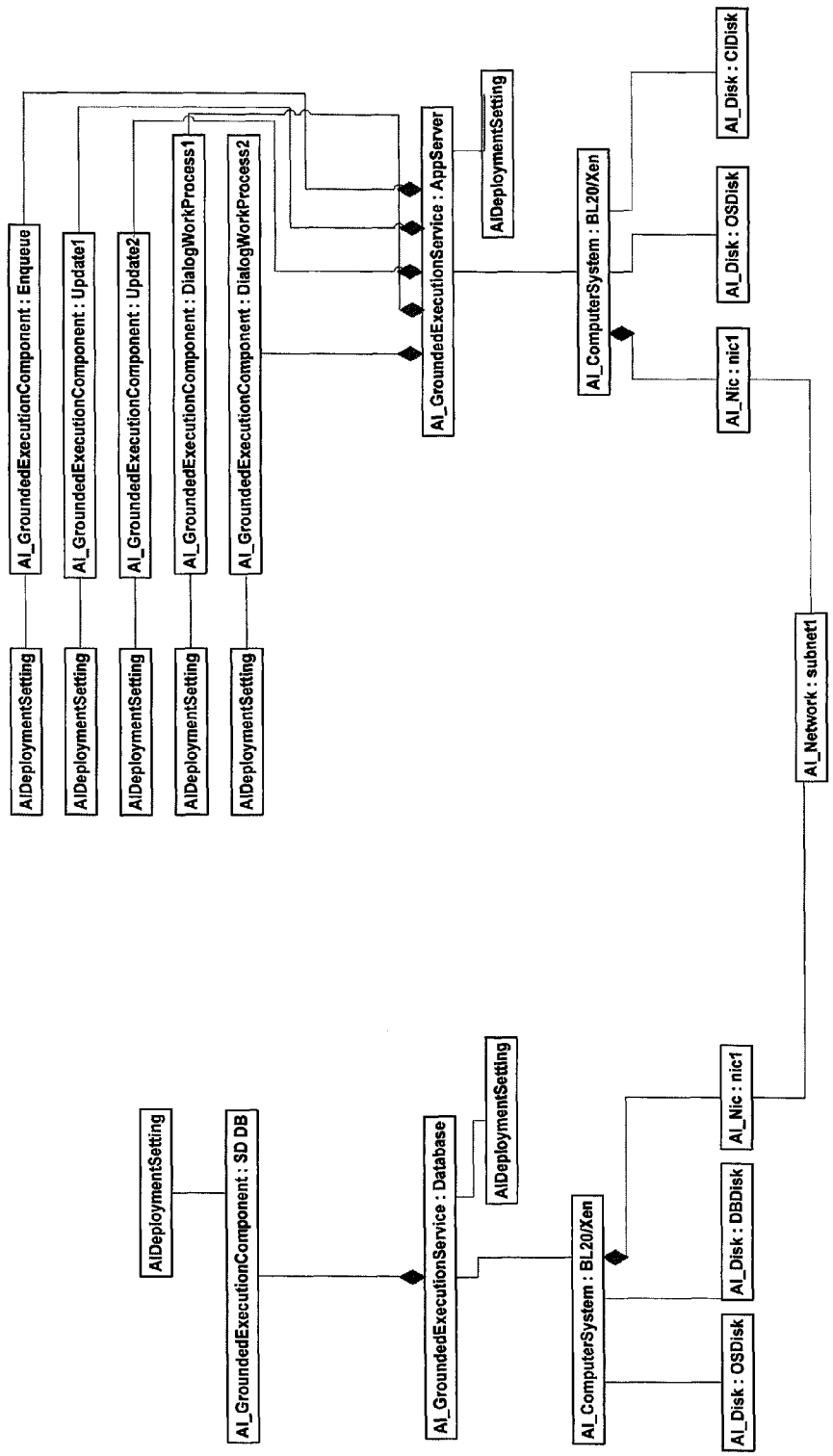
FIG. 14 shows a Grounded Model instance for a decentralized SD.

FIG. 14 Grounded Model

The Grounded Model may be generated by a design tool as it transforms the Unbound Model into the Grounded Model. It can be regarded as a candidate Grounded Model until evaluated and selected as the chosen Grounded Model. The following are some of the characteristics of the example Grounded Model of FIG. 14 compared to the template shown in FIG. 13, from which it is derived.

The number of instances of GroundedExecutionComponent has been specified.

The GroundedExecutionComponents are executed by a GroundedExecutionService. The execution relationship is consistent with that expressed in the Application Packaging Model.

The GroundedExecutionServices are run on a ComputerSystem whose type has been selected from the Infrastructure Capability Model.

There are two update components, Update1 and Update2. There are two DialogWorkProcesses, DialogWorkProcess1 and DialogWorkProcess2.

The number of slave application servers has been set at zero.

The management system is arranged to make these choices to derive the Grounded Model from the template using the Unbound Model. In the example shown, the criteria used for the choice includes the total capacity of the system, which must satisfy the time varying Performance Requirements in the Custom Model. The required capacity is determined by combining these Performance Requirements with the aggregated ResourceDemands [Direct and Indirect] of the Application Performance Model. If the first choice proves to provide too little capacity, or perhaps too much, then other choices can be made and evaluated. Other examples can have different criteria and different ways of evaluating how close the candidate grounded model is to being a best fit.

In some examples the server may only have an OS disk attached; that is because the convention in such installations is to NFS mount the CI disk to get its SAP executable files. Other example templates could have selectable details or options such as details of the CIDisk and the DBDisk being 100 GB, 20 MB/sec, non Raid, and so on. The OS disks can be of type EVA800. The master and slave application servers can have 2 to 5 dialog work processes. Computer systems are specified as having 3 GB storage, 2.6 GHz CPUs and SLES 10-Xen operating system for example. Different parameter can be tried to form candidate Grounded Models which can be evaluated to find the best fit for the desired performance or capacity or other criteria.

The Grounded Model therefore specifies the precise number and types of required instances of software and hardware deployable entities, such as GroundedExecutionComponent, GroundedExecutionService, and AIComputerSystem. AIDeploymentSettings can include for example:

InfrastructureSettings such as threshold information for infrastructure management components, for example MaxCPUUtilization—if it rises above the set figure, say 60%, an alarm should be triggered.

Management policy can specify further policy information for the management components—e.g. flex up if utilization rises above 60%

GroundedDeploymentSettings which can include all command line and configuration information so that the system can be installed, configured and started in a fully functional state.

SettingData which can provide additional configuration information that can override information provided in the GroundedDeploymentSettings. This allows many GroundedComponents to share the same GroundedDeploymentSettings (c.f. a notion of typing) with specific parameters or overrides provided by SettingData. Both the GroundedDeploymentSettings and SettingData are interpreted by the Deployment Service during deployment.

Data related to possible changes to the component such as instructions to be carried out when managing changes to the component, to enable more automation of changes.

Not all attributes are set in the Grounded Model. For example, it does not make sense to set MAC addresses in the Grounded Model, since there is not yet any assigned physical resource.

Figure 15:
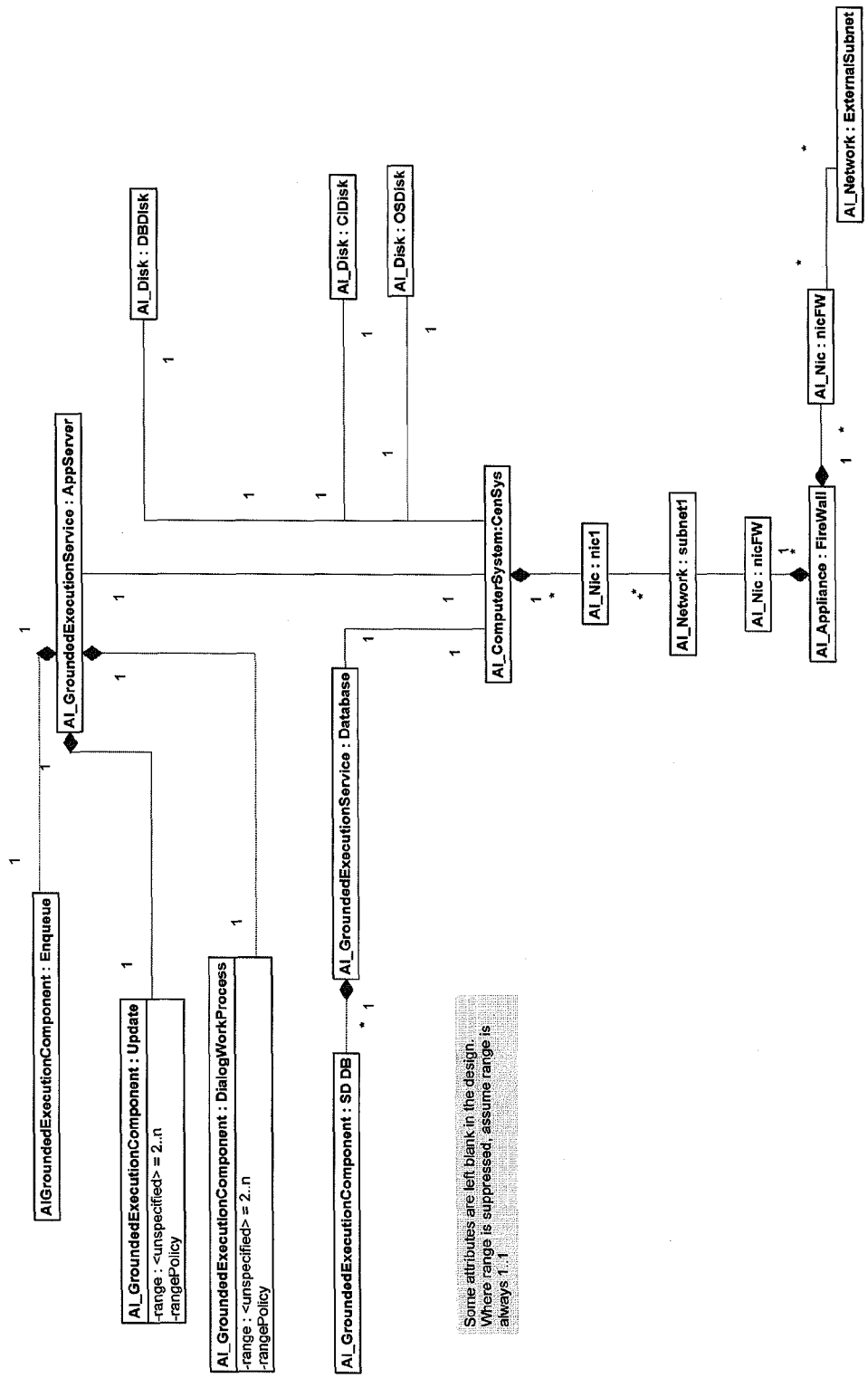
FIG. 15 shows another example of a template, suitable for a centralised secure SD example.

FIG. 15, an Alternative Adaptive Infrastructure Design Template

FIG. 15 shows an alternative adaptive infrastructure design template, in a form suitable for a centralised secure SD business process. Compared to FIG. 13, this has only one computer system, hence it is centralised. It shows security features in the form of a connection of the network to an external subnet via a firewall. This is shown by an interface AI_Nic: nicFW, and a firewall shown by AI_Appliance: FireWall.

Other templates can be envisaged having any configuration. Other examples can include a decentralised secure SD template, a decentralised highly available SD template, and a decentralised, secure and highly available SD template.

Bound Model

A Bound Model Instance for a SD system example could have in addition to the physical resource assignment, other parameters set such as subnet masks and MAC addresses. A Deployed Model could differ from the Bound Model in only one respect. It shows the binding information for the management services running in the system. All the entities would have management infrastructure in the form of for example a management service. The implementation mechanism used for the interface to the management services is not defined here, but could be a reference to a Web Service or a SmartFrog component for example. The management service can be used to change state and observe the current state. Neither the state information made available by the management service, nor the operations performed by it, are necessarily defined in the core of the model, but can be defined in associated models.

One example of this could be to manage a virtual machine migration. The application managing the migration would use the management service running on the PhysicalComputerSystem to do the migration. Once the migration is completed, the management application would update the deployed model and bound models to show the new physical system. Care needs to be taken to maintain consistency of models. All previous model instances are kept in the model repository, so when the migration is complete, there would be a new instance (version) of the bound and deployed models.

Information Hiding and the Model Information Flow

It is not always the case that for the MIF all tools and every actor can see all the information in the model. In particular it is not the case for the Service Utility Platform (SUP). It has a security model which requires strong separation between actors. For example, there can be a very strong separation between the utility management plane and the farms. If a grounded model is fed to SUP, it will not return any binding information showing the binding of virtual to physical machines, that will be kept inside the SUP. That means there is no way of telling to what hardware that farm is bound or what two farms might be sharing. What is returned from SUP is likely to include the IP address of the virtual machines in the farms (it only deals with virtual machines) and the login credentials for those machines in a given farm. SUP is trusted to manage a farm so that it gets the requested resources. SUP is one infrastructure deployment tool which could be used. There are also others. Once SUP has finished working, one could use application installation and management services to install, start and manage the applications. In general different tools will see projections of the MIF. It is possible to extract from the MIF models the information these tools require and populate the models with the results the tools return. It will be possible to transform between the MIF models and the data format that the various tools use.

Implementation:

The software parts such as the models, the model repository, and the tools or services for manipulating the models, can be implemented using any conventional programming language, including languages such as Java, or C compiled following established practice. The servers and network elements can be implemented using conventional hardware with conventional processors. The processing elements need not be identical, but should be able to communicate with each other, e.g. by exchange of IP messages.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles behind the invention and its practical applications to enable one skilled in the art to utilize the invention in various embodiments and with various modifications as are suited to the particular use contemplated. Other variations can be conceived within the scope of the claims.

The invention claimed is:

1. A method of modelling a business process having a number of computer implemented steps using software application components, to enable automatic deployment on computing infrastructure, the method having the steps of:
   automatically deriving grounded models of the business process from unbound models of the business process, the unbound models specifying the application components to be used for each of the computer implemented steps of the business process, without a complete design of the computing infrastructure, and the grounded models specifying a complete design of the computing infrastructure suitable for automatic deployment of the business process, wherein each grounded model is associated with a particular period of time for deployment,
   deriving each grounded model of the grounded models has the steps of:
      providing an infrastructure design template having predetermined parts of the computing infrastructure, predetermined relationships between the parts, and having a limited number of options to be completed from an allowable range of options associated with the infrastructure design template,
      generating a candidate grounded model by generating a completed candidate infrastructure design based on the infrastructure design template, and generating a candidate configuration of the software application components used by an unbound model of the unbound models, and
      evaluating the candidate grounded model, to determine if the candidate grounded model can be used as that grounded model.

2. The method of claim 1, the deriving of a grounded model of the grounded models being part of an initial deployment of the computer implemented steps of the business process.

3. The method of claim 1, the deriving of a grounded model of the grounded models being part of a method of changing an existing deployment of the business process.

4. The method of claim 3, the existing deployment having been created using a template, and the same template being provided for the step of deriving the grounded model for changing the existing deployment.

5. The method of claim 1, the deriving of a grounded model of the grounded models involving specifying all servers needed for the application components.

6. The method of claim 1, the deriving of a grounded model of the grounded models involving specifying a mapping of each of the application components to a server.

7. The method of claim 1, the deriving of a grounded model of the grounded models having the step of specifying a configuration of management infrastructure for monitoring of the deployed business process in use.

8. The method of claim 1, wherein the particular period of time associated with each grounded model is based on at least one of monitored demand and detected changes in resources.

9. The method of claim 1, the unbound model having a complete functional specification for implementing the steps of the business process, and specifying some non functional requirements.

10. The method of claim 9, the non functional requirements comprising anyone or more of: a number of concurrent users, an indication of desired response time, an availability level, and a security level.

11. The method of claim 1, comprising an unbound model of the unbound models having performance or capacity goals, and the evaluating step involving simulating the candidate grounded model associated with the unbound model and comparing the performance or capacity of the associated simulated candidate grounded model with the goals.

12. The method of claim 1, the infrastructure comprising virtualized entities.

13. The method of claim 12, the deriving of a grounded model of the grounded models being arranged to specify one or more virtualized entities without indicating how the virtualised entities are hosted.

14. The method of claim 13, the template specifying virtual entities, and a mapping of the application components to the virtual entities.

15. The method of claim 1 having the further step of converting a grounded model of the grounded models to a bound model, by reserving resources in the adaptable infrastructure for deploying the bound model.

16. The method of claim 15, having the further step of deploying the bound model by installing and starting the application components of the bound model.

17. A system for modeling a business process having a number of computer implemented steps using software application components, to enable automatic deployment on computing infrastructure, the system having:
a processor arranged to automatically derive grounded models of the business process from corresponding unbound models of the business process,
the corresponding unbound models each specifying the application components to be used for each of the computer implemented steps of the business process, without a complete design of the computing infrastructure, and
the grounded models each specifying a complete design of the computing infrastructure suitable for automatic deployment of the business process during a particular period of time,
the processor being arranged to retrieve an infrastructure design template having predetermined parts of the computing infrastructure, predetermined relationships between the parts, and having a limited number of options to be completed from an allowable range of options associated with the infrastructure design template,
the processor being arranged to generate candidate grounded models by generating a completed candidate infrastructure design based on the infrastructure design template, and
being arranged to generate a candidate configuration of the software application components used by each of the unbound models, and
being arranged to evaluate each of the candidate grounded models, to determine if each of the candidate grounded models can be deployed during the particular time periods as each grounded model.

18. A method of using a management system for modelling a business process having a number of computer implemented steps using software application components, to enable automatic deployment on computing infrastructure, the method having the steps of:
inputting to the management system a design for the business process, and causing the system to generate unbound models of the business process, the unbound models each specifying the application components to be used for each of the computer implemented steps of the business process, without a complete design of the computing infrastructure,
inputting to the management system a selection of an infrastructure design template having predetermined parts of the computing infrastructure, predetermined relationships between the parts, and having a limited number of options to be completed from an allowable range of options associated with the infrastructure design template,
causing the system to derive automatically grounded models of the business process from the corresponding unbound models, based on the infrastructure design template, the grounded models specifying a complete design of the computing infrastructure suitable for automatic deployment of the business process during particular time periods that correspond to each grounded model, and
receiving from the management system, results of monitoring the deployed business process during each particular time period.

19. The method of claim 18, having the steps of designing a change in an existing deployed business process and causing the system to derive automatically a grounded model of the change, based on the same template, for automatic deployment during the particular time period associated with that grounded model.

* * * * *